US011704532B2

(12) United States Patent
Yao et al.

(10) Patent No.: US 11,704,532 B2
(45) Date of Patent: *Jul. 18, 2023

(54) DYNAMIC REGION BASED APPLICATION OPERATIONS

(71) Applicant: Citrix Systems, Inc., Fort Lauderdale, FL (US)

(72) Inventors: Yajun Yao, Nanjing (CN); Yuan Bai, Nanjing (CN); Juanjuan Chen, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,552

(22) Filed: Nov. 15, 2021

(65) Prior Publication Data

US 2022/0076094 A1    Mar. 10, 2022

Related U.S. Application Data

(63) Continuation of application No. 16/887,152, filed on May 29, 2020, now Pat. No. 11,216,715, which is a
(Continued)

(51) Int. Cl.
*G06M 9/02* (2006.01)
*G06F 16/23* (2019.01)
(Continued)

(52) U.S. Cl.
CPC ........... *G06M 9/02* (2013.01); *G06F 16/2365* (2019.01); *G06F 21/52* (2013.01); *G06M 1/101* (2013.01)

(58) Field of Classification Search
CPC ..... G06M 9/02; G06M 1/101; G06F 16/2365; G06F 21/52
See application file for complete search history.

(56) References Cited

U.S. PATENT DOCUMENTS 4,810,637 A * 3/1989 Szydlo ................. G02F 1/1365
                                                        438/479
6,108,668 A * 8/2000 Bates .................... G06F 40/166
                                                        707/999.203
(Continued)

FOREIGN PATENT DOCUMENTS

CN    102414679 A    4/2012
CN    102999482      3/2013
(Continued)

OTHER PUBLICATIONS

Chinese Office Action (including English translation) issued in App. No. CN202080005346.4, dated Apr. 6, 2022, 17 pages.
(Continued)

*Primary Examiner* — Henry Tsai
*Assistant Examiner* — John B Roche

(57) ABSTRACT

Techniques are disclosed for a hybrid undo/redo for text editing, where non-linear undo and redo operations are performed across dynamic regions in a document and linear undo and redo operations are performed within the dynamic regions in the document. In an example, the hybrid undo/redo may be achieved by maintaining respective region offset values for the dynamic regions created in a document by the edits made to the document. In operation, the respective region offset values associated with the dynamic regions can be used to negate or otherwise counteract the effect of edits made in the dynamic regions.

20 Claims, 22 Drawing Sheets

Related U.S. Application Data continuation of application No. PCT/CN2020/089056, filed on May 7, 2020.

(51) Int. Cl.
    *G06F 21/52*      (2013.01)
    *G06M 1/10*      (2006.01)

(56) References Cited

U.S. PATENT DOCUMENTS

| | | |
|---|---|---|
| 9,342,510 B1 | 5/2016 | Mohr |
| 10,169,054 B2* | 1/2019 | Dhupar ................ G06F 9/451 |
| 11,216,715 B2* | 1/2022 | Yao ...................... G06F 21/52 |
| 2006/0050969 A1 | 3/2006 | Shilman |
| 2007/0283240 A9 | 12/2007 | Bargeron |
| 2008/0177800 A1 | 7/2008 | Arkhipov |
| 2009/0063580 A1 | 3/2009 | Allen |
| 2011/0107246 A1 | 5/2011 | Vik |
| 2013/0151940 A1* | 6/2013 | Bailor ............... G06F 11/1464 715/229 |
| 2014/0075364 A1 | 3/2014 | Bragdon |
| 2014/0082473 A1 | 3/2014 | Sitrick |
| 2015/0019960 A1 | 1/2015 | Kobayashi |
| 2016/0055226 A1 | 2/2016 | Bruening |
| 2019/0137435 A1* | 5/2019 | Johnson ............. C12Q 1/6869 |

FOREIGN PATENT DOCUMENTS

| | | |
|---|---|---|
| CN | 102999482 A | 3/2013 |
| EP | 0872801 A2 | 10/1998 |
| WO | 2007072051 | 6/2007 |

OTHER PUBLICATIONS

Rui Li et al., "A Regional Undo Mechanism for Text Editing", International Working on Collaborative Editing System, Jan. 1, 2003.

Australian Examination Report dated Mar. 25, 2021 for Australian Application No. 2020335015; 8 pages.

Australian Examination Report No. 2 for App. No. AU2020335015, dated Sep. 30, 2021, 5 pages.

Li, Rui; Li, Du. "A Regional Undo Mechanism for Text Editing". Jan. 2003. Texas A&M, 10 pages (Year: 2003).

Office Action (Notice of Allowance and Fees Due (PTOL-85)) dated Nov. 17, 2021 for U.S. Appl. No. 16/887,152 (pp. 1-4).

PCT International Search Report and Written Opinion dated Jan. 26, 2021 for International Application No. PCT/CN2020/089056; 10 pages.

\* cited by examiner

Dynamic Region Data Structure 600

Region Start Value
Region End Value
Region Offset Value

FIG. 6

Edit Operation Record 700

Description of Edit Operation
Line Start Value
Line End Value
Change Number Value (Optional)

FIG. 7

```
1   /*++ //C1
2   :
3   //C4
4   Module Name:
5   :
6     driver.c
7   :
8   Abstract: //C2
9   :
10     This file contains the driver entry points and callbacks.
11  :           ←904              ←902
12  Environment:
13  :
14     Kernel-mode Driver Framework
15  :                              ←906
16  ..*/
17
18  #include "driver.h"
19  #include "driver.tah"
20
21  #ifdef ALLOC_PRAGMA //C3, C5
22    #pragma alloc_text (INIT, DriverEntry)
```

FIG. 9A

```
1   /*++ //C1
2   :
3   //C4
4   Module Name:
5   :
6     driver.c
7   :
8   Abstract: //C2
9   :
10     This file contains the driver entry points and callbacks.
11  :           ←904
12  Environment:
13     Kernel-mode Driver Framework
14  :                              ←906
15  ..*/ 908
16
17  #include "driver.h"
18  #include "driver.tah"
19
20  #ifdef ALLOC_PRAGMA //C3, C5
21    #pragma alloc_text (INIT, DriverEntry)
22    #pragma alloc_text (PAGE, KMDFDriver1EvtDeviceAdd)
```

FIG. 9B

```
1206
     1   /*++ //C1
     2   :                                    1202
     3   //C4
     4   Module Name:
     5   :
     6      driver.c
     7
     8   Abstract: //C2                  1204
     9    1208
    10      This file contains the driver entry points and callbacks.
    11   :
    12   Environment:
    13      Kernel-mode Driver Framework
    14   :
    15   ..*/
    16
    17   #include "driver.h"
    18   #include "driver.tah"
    19
    20   #ifdef ALLOC_PRAGMA //C3, C5
    21   #pragma alloc_text (INIT, DriverEntry)
    22   #pragma alloc_text (PAGE, KMDFDriveriEvtDeviceAdd)
```

FIG. 12A

```
1212
     1   /*++ //C1
     2   :
     3   //C4
     4   Module Name: //C7
     5   //C7                                 1210
     6      driver.c//C7
     7   //C7
     8   Abstract: //C2
     9
    10      This file contains the driver entry points and callbacks.
    11   :
    12   Environment:
    13      Kernel-mode Driver Framework
    14   :
    15   ..*/
    16
    17   #include "driver.h"
    18   #include "driver.tah"
    19
    20   #ifdef ALLOC_PRAGMA //C3, C5
    21   #pragma alloc_text (INIT, DriverEntry)
    22   #pragma alloc_text (PAGE, KMDFDriveriEvtDeviceAdd)
```

FIG. 12B

DYNAMIC REGION BASED APPLICATION OPERATIONS

CROSS REFERENCE TO RELATED APPLICATION

This application is a continuation of and claims the benefit of U.S. patent application Ser. No. 16/887,152 filed on May 29, 2020, which is a continuation of and claims the benefit of PCT Patent Application No. PCT/CN2020/089056 filed on May 7, 2020 in the English language in the State Intellectual Property Office, the contents of which are hereby incorporated herein by reference in their entireties.

BACKGROUND

Many software applications (also referred to as "application software", or simply "applications" or more simply "apps") provide an edit function with which a user may make changes to a document. For example, such an edit function may allow a user to change existing content, add content, or delete content in a document. Many of these applications also support undo and/or redo operations. In brief, an undo operation erases or undoes the last change made to a document, thus reverting the document to an older state (a state prior to the last change to the document). A redo operation reverses or negates the most recent undo operation.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include providing a data structure for a region of a document, the data structure including a start value, an end value, and an offset value that define the region within the document. The method may also include, responsive to detection of a modification of content within the region, determining a count of the number of lines of the document within the region, adjusting at least one of the start value, the end value, and the offset value of the region to change an area of the region based on the count of the number of lines, and pushing a record of the modification onto a stack of the region in response to the modification of content within the region, the stack configured to receive elements representative of individual actions to be performed on content within the region of the document, so as to enable the modification to be undone or redone in a non-linear fashion.

In one aspect, the region is a first region and the method may also include, responsive to detection of a modification of content that adds or deletes at least one line within a second region of the document located above the first region of the document, adjusting the offset value of the first region to change an area of the first region based on the modification of content within the second region.

According to another illustrative embodiment provided to illustrate the broader concepts described herein, a system includes a memory and one or more processors in communication with the memory. The processor may be configured to provide a data structure for a region of a document, the data structure including a start value, an end value, and an offset value that define the region within the document. The processor may be also configured to, responsive to detection of a modification of content within the region, determine a count of the number of lines of the document within the region, adjust at least one of the start value, the end value, and offset value of the region to change an area of the region based on the count of the number of lines, and push a record of the modification onto a stack of the region in response to the modification of content within the region, the stack configured to receive elements representative of individual actions to be performed on content within the region of the document, so as to enable the modification to be undone or redone in a non-linear fashion.

According to another illustrative embodiment provided to illustrate the broader concepts described herein, a method may include providing a first data structure for a first region of a document, the first data structure including a start value, an end value, and an offset value that define the first region within the document, and providing a second data structure for a second region of a document below the first region, the second data structure including a start value, an end value, and an offset value that define the second region within the document. The method may also include, responsive to detection of a modification of content within the first region, determining a count of the number of lines added or deleted in the first region, adjusting at least one of the start value and the end value of the of the first region based on the modification of content within the first region, and adjusting the offset value of the second region to change an area of the second region based on the count of the number of lines added or deleted in the first region.

In one aspect, the method may also include, responsive to detection of the modification of content within the first region, pushing a record of the modification onto a stack of the first region in response to the modification of content within the first region, the stack configured to receive elements representative of individual actions to be performed on content within the first region of the document, so as to enable the modification to be undone or redone in a non-linear fashion.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 is a diagram of an example dynamic region data structure, in accordance with an embodiment of the present disclosure.

FIG. 7 is a diagram of an example edit operation record, in accordance with an embodiment of the present disclosure.

FIGS. 9A and 9B show an example deletion of a line in a document, in accordance with an embodiment of the present disclosure.

FIGS. 12A and 12B show an example merge of two dynamic regions in a document, in accordance with an embodiment of the present disclosure.

DETAILED DESCRIPTION

Figure 1:
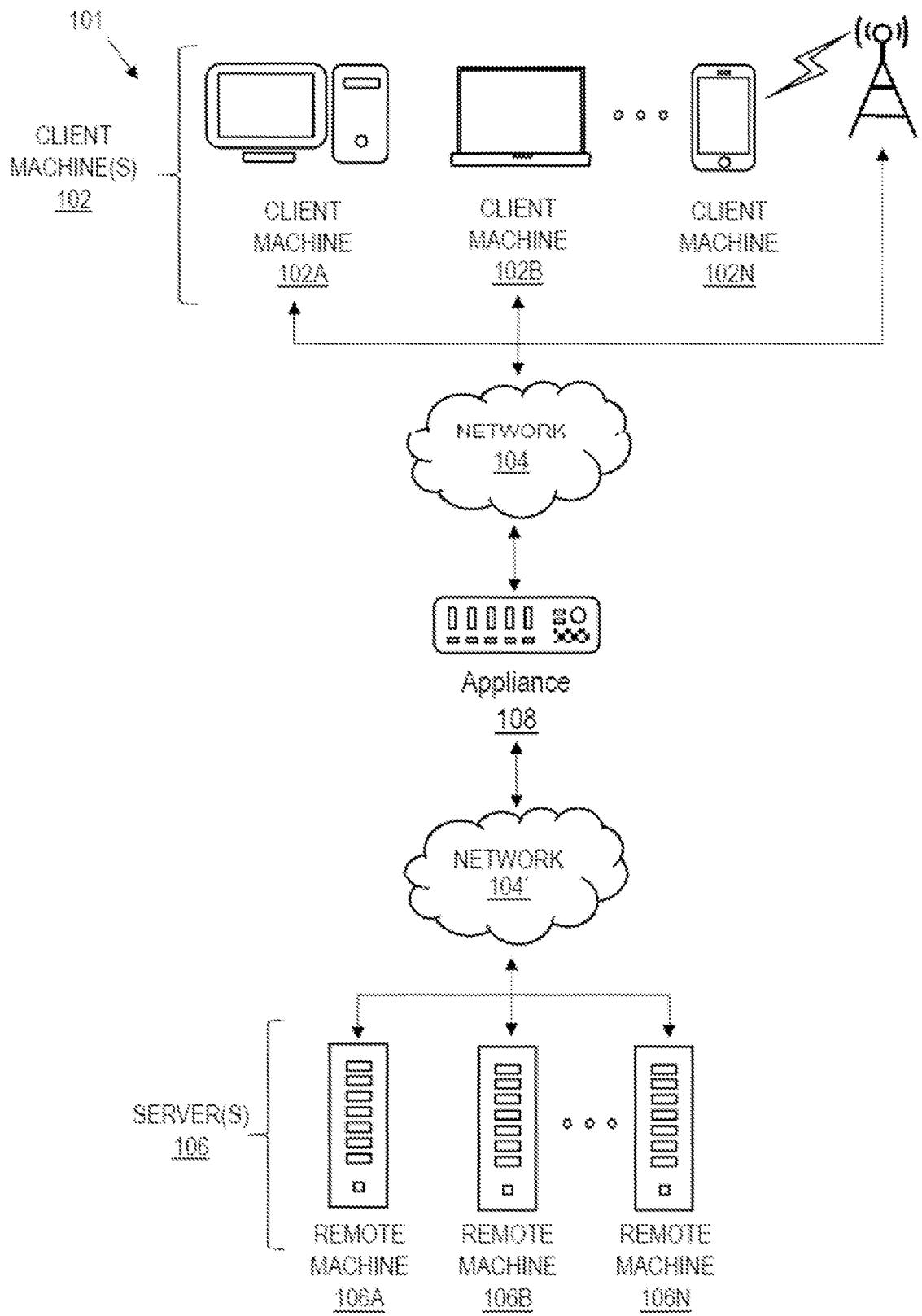
FIG. 1 is a diagram of an illustrative network computing environment in which embodiments of the present disclosure may be implemented.

Undo/redo operations supported by many existing applications enhance user-computer interaction by allowing a user to make changes to a document knowing that the changes can be easily undone and redone. The ability to undo and redo changes made to a document instills in the user confidence to make changes the user would not typically make by providing a safety net.

Many conventional undo implementations are linear undo operations. Linear undo is typically implemented with a stack (e.g., a last in first out (LIFO) data structure) that stores a history of all executed operations. When a new operation is performed, this operation is placed or "pushed" on top of the stack. Therefore, only the last operation performed (the operation at the top of the stack) can be removed or "popped" from the stack to be undone. The undo operation can be repeated as long as the stack is not empty.

For example, suppose a user performs the sequence of operations A, B, C, D, and E. At the conclusion of these operations, the contents of the stack, from bottom to top, is A-B-C-D-E. Thus, the user is only able to undo operation E, which is at the top of the stack.

In other words, the user is unable to undo operation A, B, C, or D because these operations are not at the top of the stack. For example, if the user wants to undo operation B, the user will first have to undo operation E, then operation D, and then operation C. After operation C is undone, operation B will be at the top of the stack, and the user will then be able to undo operation B. Hence, the linear characteristic of the linear undo. However, it may be that the user does not want operations C, D, and E undone. In this case, the user will be inconvenienced since the user will need to repeat (i.e., redo) operations C, D, and E after operation B is undone.

Concepts, devices, systems, and techniques are disclosed for a hybrid undo/redo for text editing, where non-linear undo and redo operations are performed across dynamic regions in a document and linear undo and redo operations are performed within the dynamic regions in the document. A dynamic region in a document defines a region or a portion of the document where one or more edits (interchangeably referred to herein as "changes" or "modifications") have been made to the document. A region offset value associated with a particular dynamic region is used to maintain a record of the movement or shifting of the particular dynamic region within the document as a result of edits that involve line additions (insertions) and line reductions (deletions) made in dynamic regions located above (i.e., higher than) the particular dynamic region in the document. As such, the region offset value of the particular dynamic region can be used to negate or otherwise counteract the effect of such edits to the particular dynamic region (e.g., negate the effect of the shifting of the particular dynamic region within the document) to allow for non-linear undo operations to be performed across the dynamic regions in the document. In other words, the respective region offset values for the dynamic regions can be used to resolve the dependency across the dynamic regions, thus enabling non-linear undo across the dynamic regions in a document.

In an embodiment, the hybrid undo and redo capabilities may be implemented and provided by a text editing application software. Nonlimiting examples of application software suitable for implementing the techniques disclosed herein include VISUAL STUDIO CODE provided by Microsoft Corporation of Redmond, Wash., Notepad++, or other suitable text editing application software. The hybrid undo/redo is achieved by maintaining respective region offset values for the dynamic regions in the document.

For example, a user may edit (i.e., modify) a document using text editing software. At the start of the editing session, the document does not include any dynamic regions. The user may make a first edit to the text in line 7 of the document, which causes the generation of a first dynamic region that includes line 7 in the document. The first edit is recorded as being made in (i.e., associated with) the first dynamic region in the document. The user may then make a second edit to the text in line 13 of the document. Since line 13 is not sufficiently near the first dynamic region (e.g., line 13 is not within a threshold range of the first dynamic region), the second edit causes the generation of a second dynamic region that includes line 13 in the document. As line 13 is below line 7, the second dynamic region is located below (i.e., lower than) the first dynamic region in the document. The second edit is recorded as being made in the second dynamic region. The user may then make a third edit that adds (inserts) a new line 9 in the document. The third edit also includes a change to original line 8 caused by a carriage return (e.g., line break) input to the end of original line 8 to add new line 9. Since changed line 8 is sufficiently close to the first dynamic region, the first dynamic region is expanded to include lines 8 and 9 (i.e., the first dynamic region now includes lines 7-9), and the third edit is recorded as being made in the first dynamic region. The addition of new line 9 causes the lines of text lower in the document (i.e., original lines 9 and higher) to shift down by one line. For instance, original line 9 before the addition of new line 9 becomes line 10 after the addition of new line 9, original line 10 before the addition of new line 9 becomes line 11 after the addition of new line 9, and so on.

Since the second dynamic region, which includes original line 13, is below new line 9 in the document, original line 13 becomes line 14 after the addition of new line 9. To account for the shift downward of original line 13 by one line, a region offset value associated with the second dynamic region is incremented by one (i.e., the value one is added to the region offset value of the second dynamic region). Note that, up to this point, the third edit is the last edit performed by the user.

With linear undo, the user is able to undo the third edit but not the first or second edits. That is, the user is only able to undo the last edit performed, and not able to undo the edits in an arbitrary order.

However, in accordance with the concepts, devices, systems, and techniques described herein, by maintaining a region offset value for the second dynamic region that accounts for the shift in the lines included in the second dynamic region, the user is able to undo the last edit (i.e., in this example, the second edit) which was performed in the second dynamic region without first undoing the last edit (i.e., the third edit) which was performed in the first dynamic region. In other words, the respective region offset values for the dynamic regions in a document allow for performing undo operations in arbitrary order across the dynamic regions in the document. This is because the region offset value corresponds to a value that can be added to a base or relative address to derive an actual address or location in the document at which to perform the undo. These and other advantages, variations, and embodiments will be apparent in light of this disclosure.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
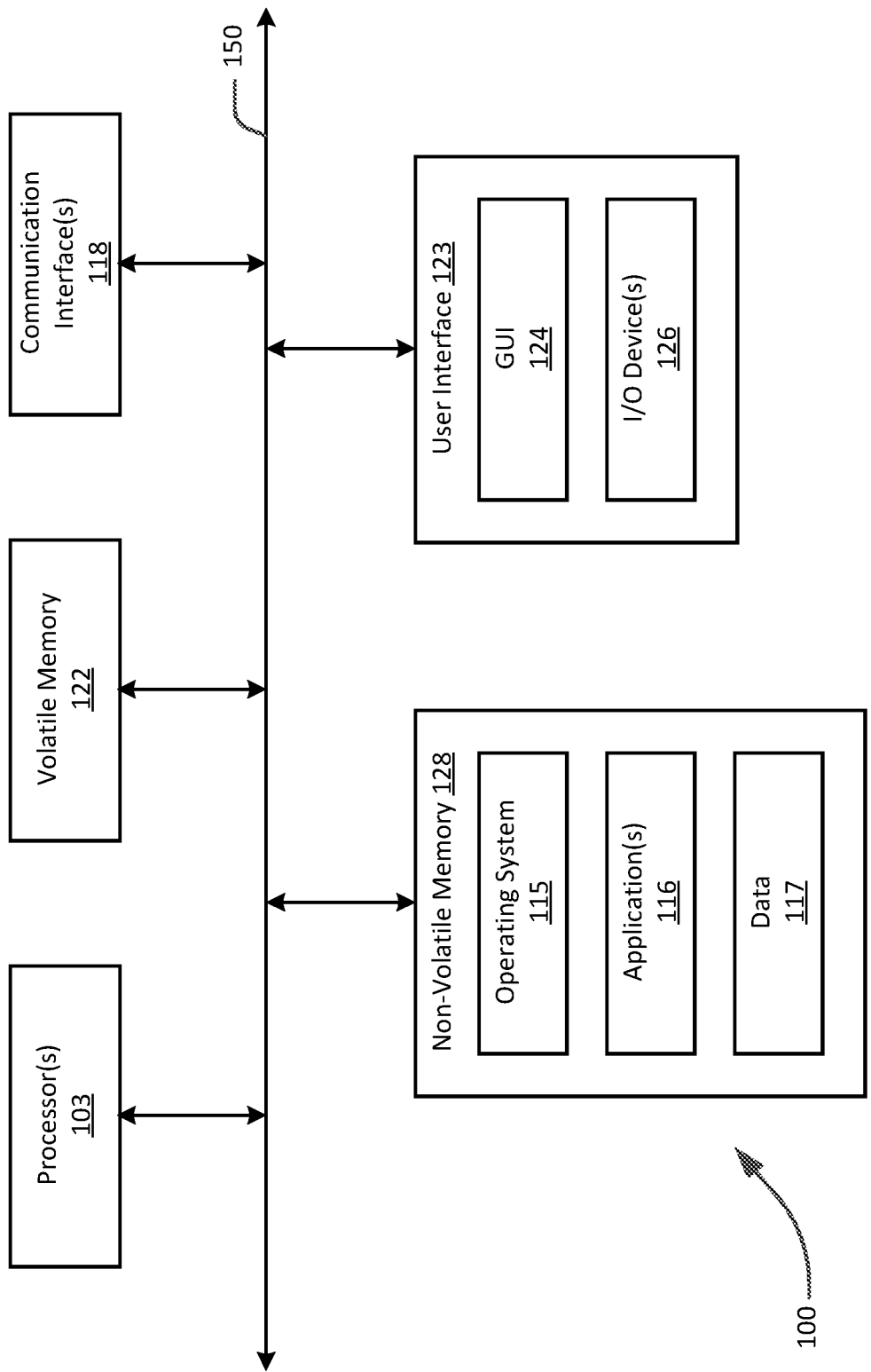
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (CPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
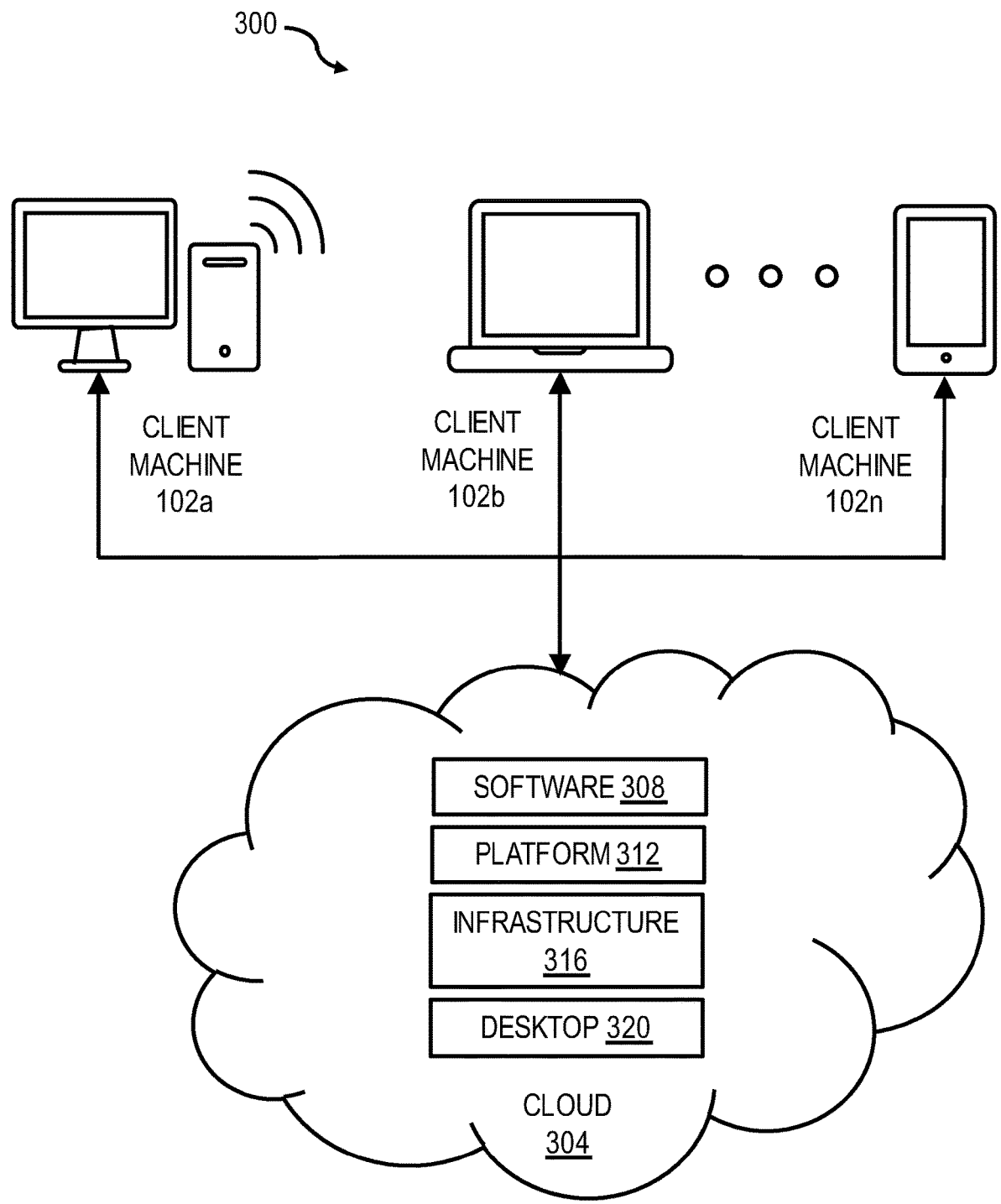
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif. For example, in some embodiments, the hybrid undo/redo concepts and techniques described herein can be implemented by a SaaS application to support text processing with region based undo/redo functionality via the RESTful application programming interface (API) or library.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
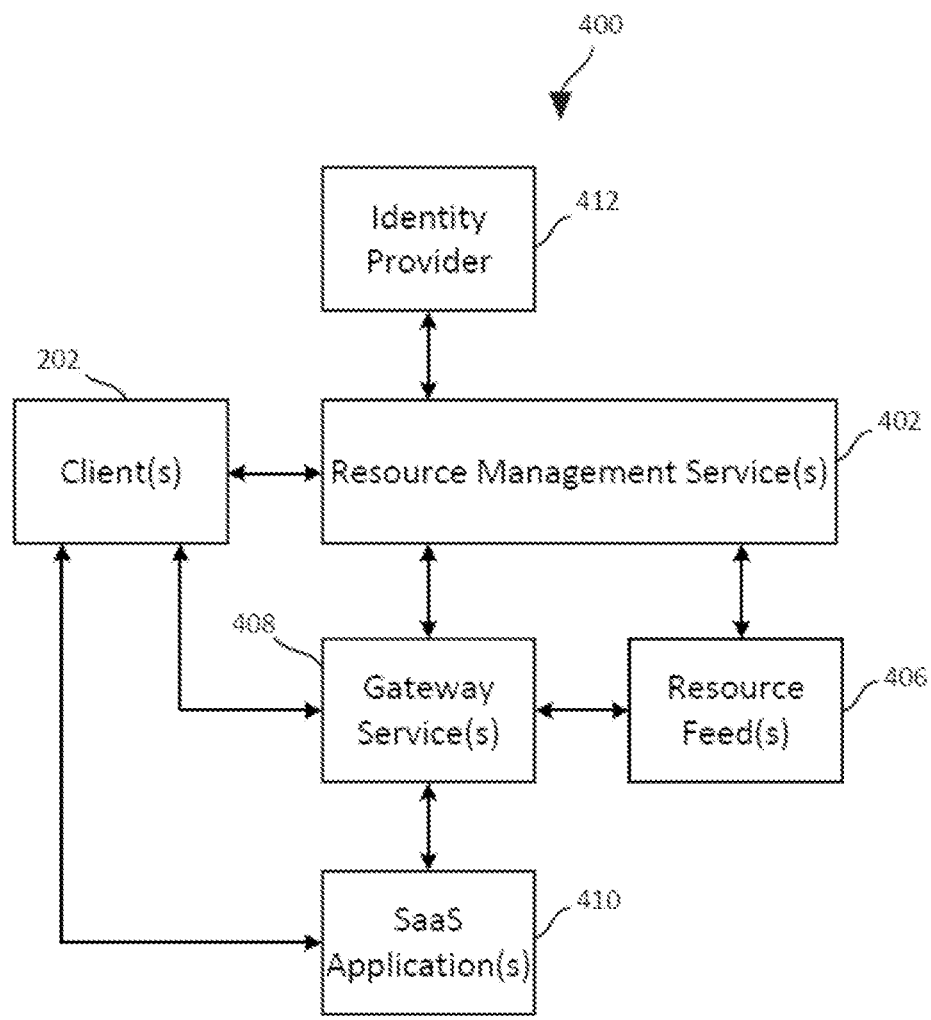
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
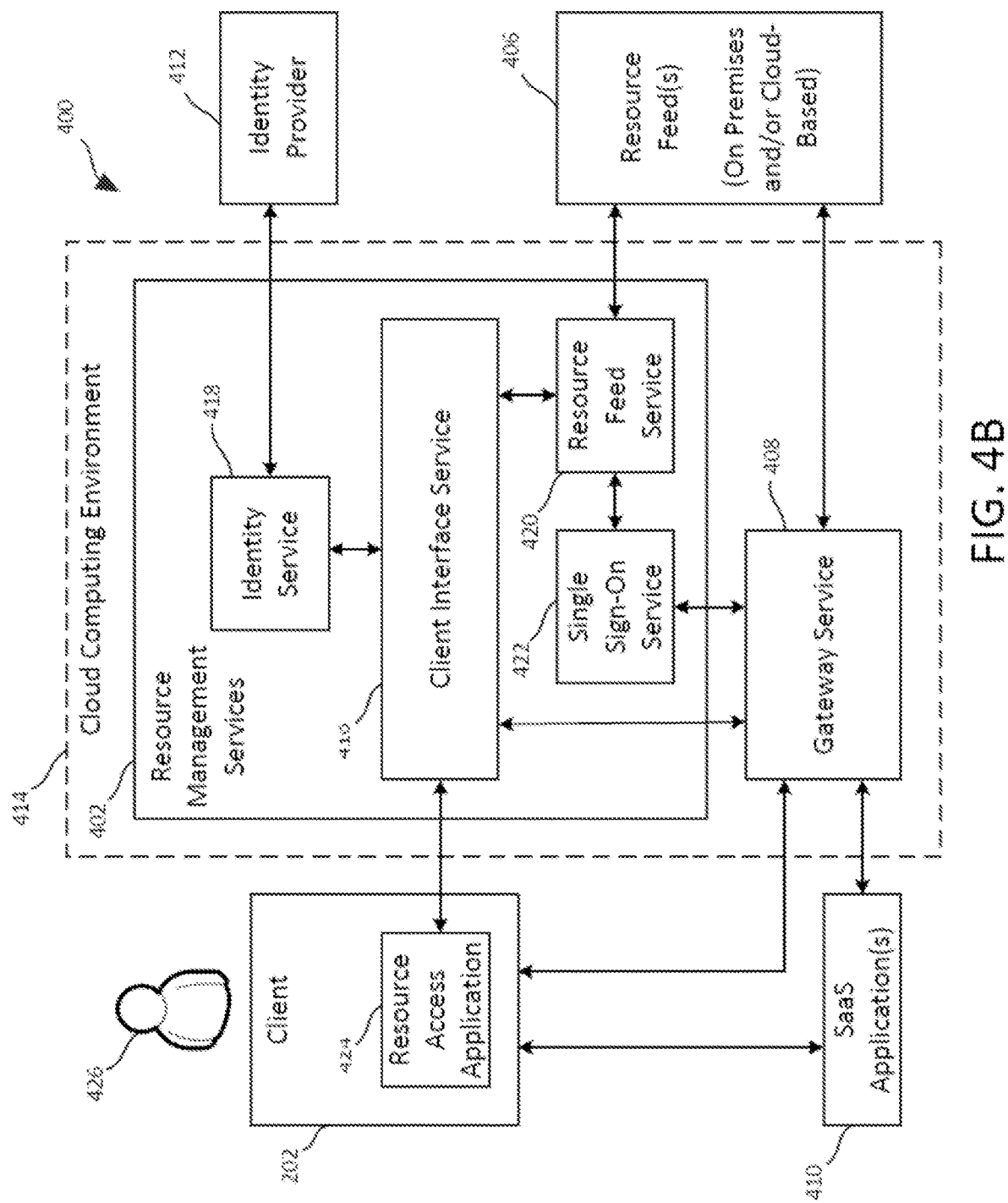
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202. For instance, in the case of Citrix Cloud, in some embodiments, resource access application 424 may be Citrix Workspace App and be programmed or otherwise configured to provide text processing with region based undo/redo. Text processing with region based undo/redo will be further described below at least in conjunction with FIGS. 5-17.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
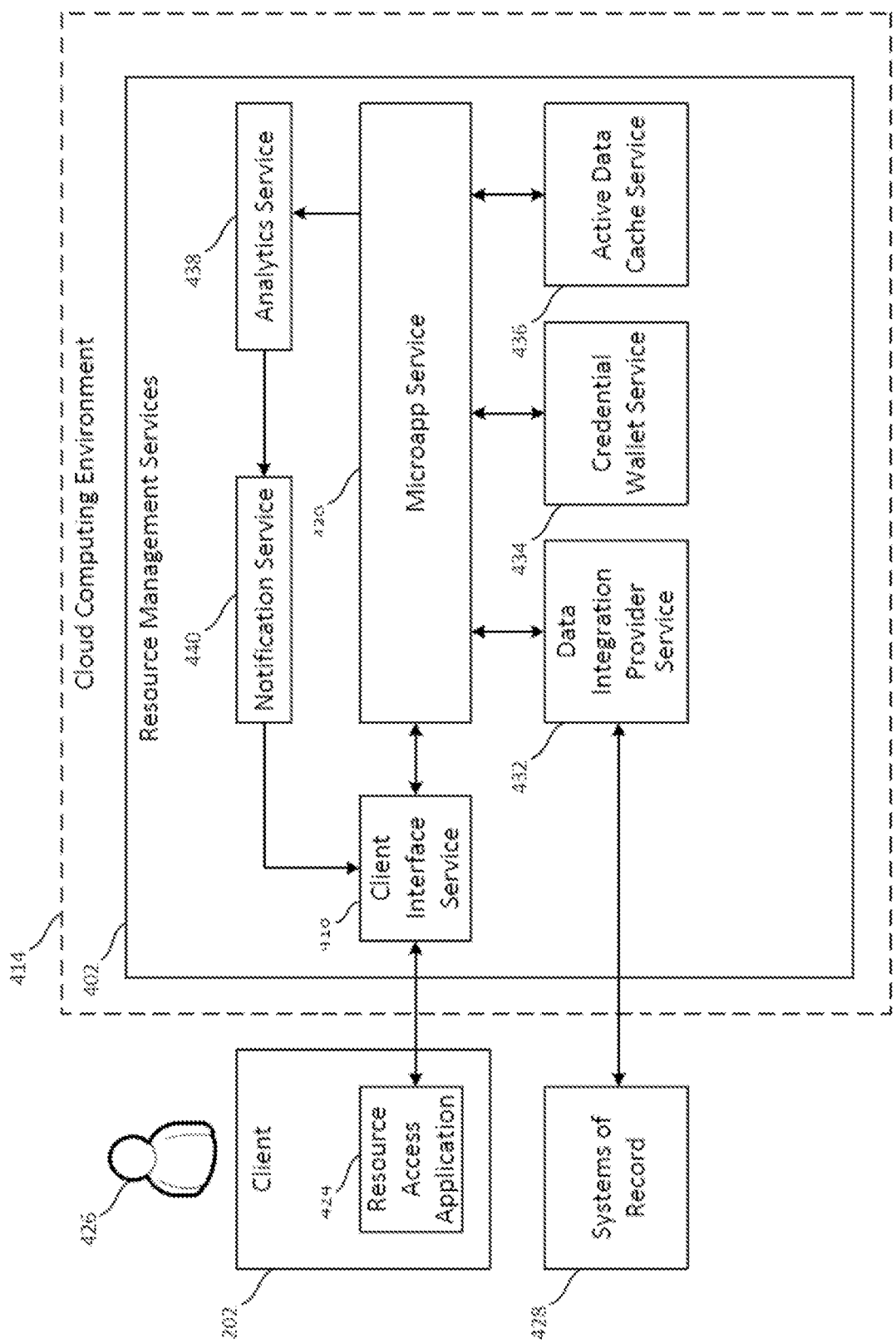
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6 ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
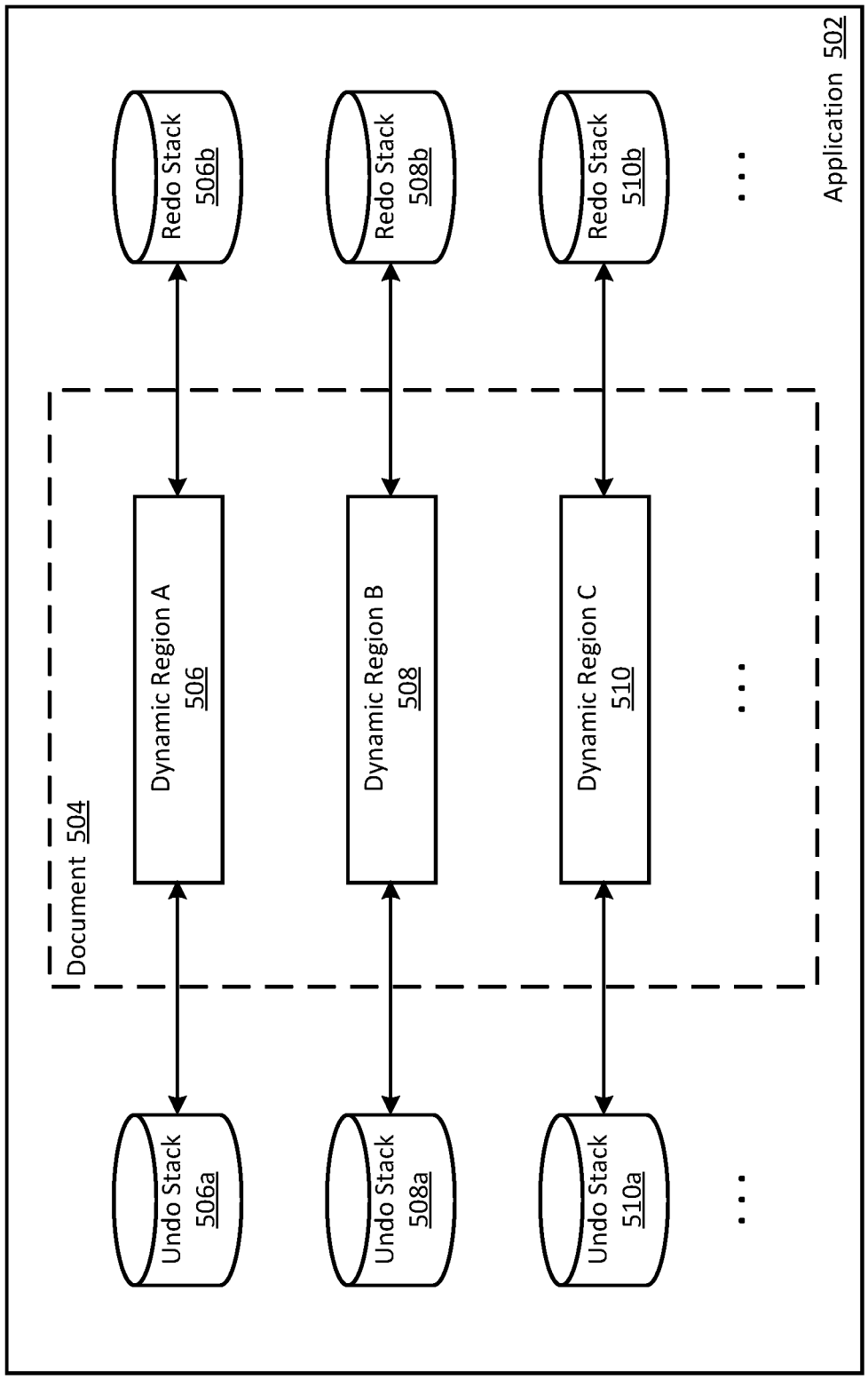
FIG. 5 is a block diagram showing example dynamic regions in a document, in accordance with an embodiment of the present disclosure.

FIG. 5 is a block diagram showing example dynamic regions 506, 508, 510 in a document 504, in accordance with an embodiment of the present disclosure. For example, as shown in FIG. 5, a user may be editing document 504 using a text editing application 502 running on a suitable computing device, such as computing device 400 of FIG. 4. In response to the user's edits to document 504, as shown in FIG. 5, application 502 may create dynamic region A 506, dynamic region B 508, and dynamic region C 510. Dynamic regions 506, 508, 510 define respective regions in document 504 where one or more edits have been made to the document. In general, dynamic regions 506, 508, 510 are "dynamic" in the sense that, once created, the regions may adjust or otherwise change in size and/or location within the document based on additional edits made to the document. For instance, dynamic region A 506 defines a region in document 504 that includes or hosts one or more edits made by the user, dynamic region B 508 defines a region in document 504 that includes or hosts one or more edits made by the user, and dynamic region C 510 defines a region in document 504 that includes or hosts one or more edits made by the user. To this end, dynamic regions 506, 508, 510 may be defined using respective dynamic region start values and dynamic region end values. A dynamic region start value indicates a line number in document 504 at which a particular dynamic region starts, and a dynamic region end value indicates a line number in document 504 at which the particular dynamic region ends. Also, as further shown in FIG. 5, within document 504, dynamic region A 506 is located above dynamic region B 508 which is located above dynamic region C 510. While only three dynamic regions are depicted in FIG. 5 for purposes of clarity, it will be appreciated that application 502 may create any number of dynamic regions in document 504 based on the locations of the edits made by the user in document 504.

Still referring to FIG. 5, dynamic regions 506, 508, 510 have undo stacks and redo stacks. For instance, as shown, dynamic region A 506 has an undo stack 506a and a redo stack 506b, dynamic region B 508 has an undo stack 508a and a redo stack 508b, and dynamic region C 510 has an undo stack 510a and a redo stack 510b. Undo stacks 506a, 508a, 510a and redo stacks 506b, 508b, 510b may be implemented as last in first out (LIFO) data structures that store the edit operations and the undo operations, respectively, performed to document 504. For instance, when an edit operation is performed in dynamic region A 506, the edit action is pushed onto the top of undo stack 506a. Similarly, when an edit operation is performed in dynamic region B 508, the edit action is pushed onto the top of undo stack 508a, and when an edit operation is performed in dynamic region C 510, the edit action is pushed onto the top of undo stack 510a.

When the user triggers an undo action in a dynamic region, the edit action at the top of the undo stack for the dynamic region is popped (i.e., removed from the top of the undo stack), the inverse of the popped edit action performed, and the edit action popped from the undo stack is pushed (i.e., placed) onto the top of the redo stack of the dynamic region. Note that the inverse of the popped edit action is performed in order to undo the edit action. Also, pushing the edit action that was popped from the undo stack onto the top of the redo stack allows for redoing the undone edit action at a later time. For instance, when an undo action is triggered in dynamic region A 506, the edit action at the top of undo stack 506a is popped, the inverse of the popped edit action performed, and the edit action popped from undo stack 506a pushed onto the top of redo stack 506b. Similarly, when an undo action is triggered in dynamic region B 508, the edit action at the top of undo stack 508a is popped, the inverse of the popped edit action performed, and the edit action popped from undo stack 508a pushed onto the top of redo stack 508b, and when an undo action is triggered in dynamic region C 510, the edit action at the top of undo stack 510a is popped, the inverse of the popped edit action performed, and the edit action popped from undo stack 510a pushed onto the top of redo stack 510b.

When the user triggers a redo action in a dynamic region, the edit action at the top of the redo stack of the dynamic region is popped, the popped edit action performed, and the edit action popped from the redo stack (i.e., the performed redo action) is pushed onto the top of the undo of the dynamic region. For instance, when a redo action is triggered in dynamic region A 506, the edit action at the top of redo stack 506b is popped, the popped edit action performed, and the performed edit action pushed onto the top of undo stack 506a. Similarly, when a redo action is triggered in dynamic region B 508, the edit action at the top of redo stack 508b is popped, the popped edit action performed, and the performed edit action pushed onto the top of undo stack 508a, and when a redo action is triggered in dynamic region C 510, the edit action at the top of redo stack 510b is popped, the popped edit action performed, and the performed edit action pushed onto the top of undo stack 510a. The result of generating distinct dynamic regions in a document and maintaining respective undo and redo stacks for the distinct dynamic regions, is the ability to perform non-linear undo operations across the dynamic regions from the perspective of all edits made to the document. However, within a dynamic region, the undo and redo operations are linear since one undo stack and one redo stack are used to store the edits made within the dynamic region.

FIG. 6 is a diagram of an example dynamic region data structure 600, in accordance with an embodiment of the present disclosure. In an embodiment, text editing application 502 may generate and maintain respective dynamic region data structures 600 for the dynamic regions created in a document. For example, in an implementation, text editing application 502 may create a dynamic region in a document the first time a user changes a line or consecutive lines in the document. Text editing application 502 may delete (i.e., remove) a dynamic region created in a document upon the user undoing all the changes made in the dynamic region. Text editing application 502 may merge (i.e., join) neighboring or adjacent dynamic regions in the document into a single dynamic region if the user makes a change across neighboring dynamic regions. Text editing application 502 may separate a dynamic region in the document into two neighboring dynamic regions if the user undoes a change that caused the merging of the two neighboring dynamic regions.

As shown in FIG. 6, dynamic region data structure 600 includes a region start value, a region end value, and a region offset value. The region start value indicates a relative start line number for a dynamic region defined by dynamic region data structure 600. The region end value indicates a relative end line number for the dynamic region defined by dynamic region data structure 600. The region offset value indicates a line number offset inside of the dynamic region defined by dynamic region data structure 600. The region offset value may be a positive value (i.e., offset of a positive number of lines) or a negative value (i.e., offset of a negative number of lines). An edit dependency issue may arise in instances where lines are added or deleted in a particular dynamic region, and the line numbers in the document below this particular dynamic region are impacted by the number of lines added or deleted in the particular dynamic region. In these cases, the corresponding line numbers in dynamic regions below the particular dynamic region will need to be adjusted to account for the number of lines added or deleted in the particular dynamic region. That is, the line numbers may change based upon the addition or deletion being made. Thus, the line numbers are said to be dependent upon the edits being made. To this end, respective region offset values of the dynamic regions below the particular dynamic region are updated to account for the added or deleted lines in the particular dynamic region. Thus, the region offset value is used to resolve the edit dependency issue across the dynamic regions created in the document.

The region start and the region end values may be relative values in that these values may not indicate actual (i.e., real) start line number and end line number of the dynamic region in the document. In other words, the region start value and the region end value may not indicate the actual location of the dynamic region in the document at a given point in time during the editing session. Rather, the actual start line number of the dynamic region in the document can be computed or otherwise determined as the sum of the region start value and the region offset value (region start value+region offset value). Similarly, the actual end line number of the dynamic region in the document can be computed or otherwise determined as the sum of the region end value and the region offset value (region end value+region offset value). For example, suppose a dynamic region in a document is defined by a region start value of 8, a region end value of 10, and a region offset value of 1. In this case, the actual start line number of the dynamic region in the document is line 9 (8+1) and the actual end line number of the dynamic region is line 11 (10+1). In the example above, suppose the region offset value is −2. In this case, the actual start line number of the dynamic region in the document is line 6 (8−2) and the actual end line number of the dynamic region is line eight 8 (10−2).

FIG. 7 is a diagram of an example edit operation record 700, in accordance with an embodiment of the present disclosure. In an embodiment, text editing application 502 may generate and maintain respective edit operation records 700 for the edit operations performed during a document editing session. As shown, edit operation record 700 includes a description of an edit operation, a line start value, a line end value, and an optional change number value. The description of an edit operation defines or otherwise describes the edit or change that is made to the document by the edit operation. The line start value indicates a start line number in the document that was changed (i.e., affected) by the edit operation. The line end value indicates an end line number in the document that was changed by the edit operation. In other words, the line start value indicates a location (i.e., line number) in the document at which the edit operation starts, and the line end value indicates a location (i.e., line number) in the document at which the edit operation ends. For example, if an edit operation changes lines 7 and 8 in a document, the line start value may be set 7 and the line end value may be set to 8. The optional change number value is a value that uniquely identifies the edit operation in the editing session. For example, if the edit operation is the seventh editing operation performed during the editing session, the change number value may be set to 7.

FIGS. 8A-8E show an example operation of dynamic region data structures in processing edit operations performed during a document editing session, in accordance with an embodiment of the present disclosure. Text editing application 502 may use dynamic region data structures to manage the generation and manipulation of dynamic regions during a document editing session. In an example use case and embodiment, a user may access and edit the contents of a document using text editing application 502. At the start of a document editing session by the user, text editing application 502 initializes or starts without any dynamic regions in the document.

Figure 8A:
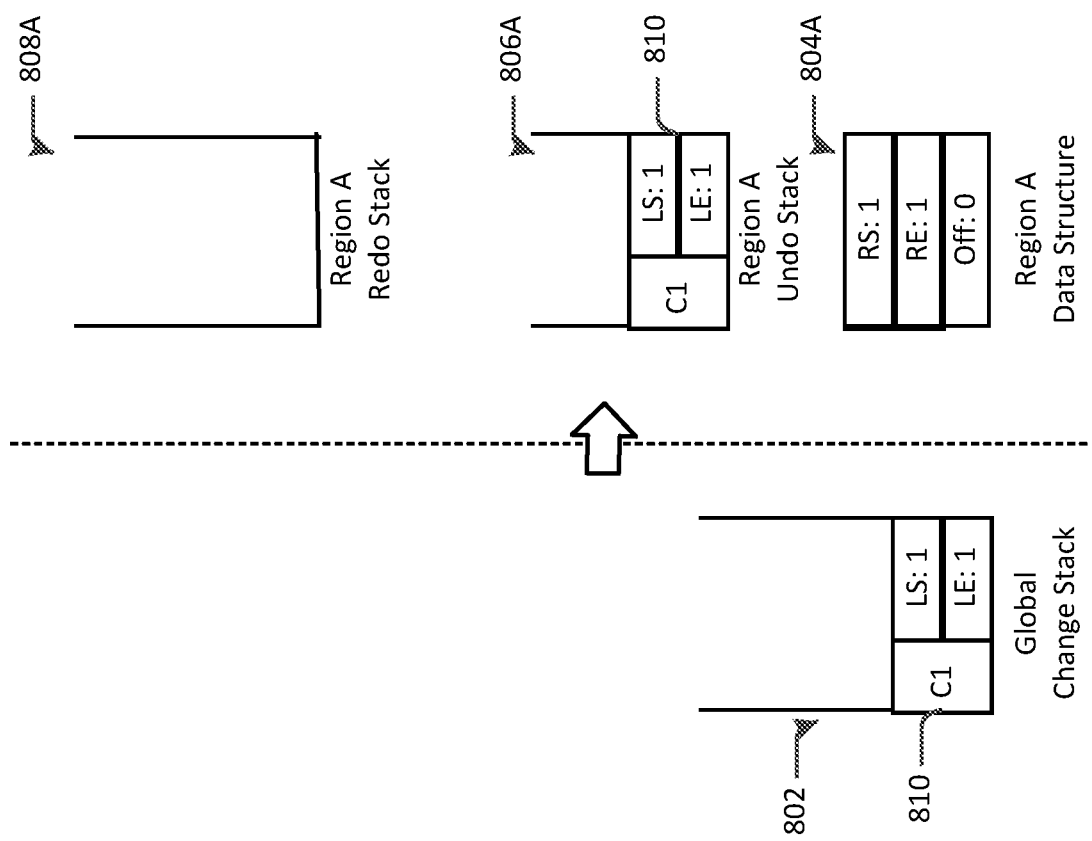
FIGS. 8A-8E show an example operation of dynamic region data structures in processing edit operations performed during a document editing session, in accordance with an embodiment of the present disclosure.

For example, at the start of the editing session, the user may make an edit to the text in line 1 of the document. In response to detecting the edit to line 1, text editing application 502 (FIG. 5) may create an edit operation record 810 to record the change to the document resulting from the edit to line 1. To this end, as can be seen in FIG. 8A, text editing application 502 may include in edit operation record 810 a description of the change to line 1 (denoted C1 in FIG. 8A), and set the line start value to line 1 (LS: 1) and the line end value to line 1 (LE: 1). Since the resulting change is to a single line (line 1), the line start value is the same as the line end value.

In an implementation, text editing application 502 may store edit operation record 810 in an optional global change stack 802. Text editing application 502 may use global change stack 802 to record a history of the edit operations executed during the editing session. To this end, when a new edit operation is executed, text editing application 502 may add an edit operation record corresponding to the new edit operation to the top of global change stack 802.

Text editing application 502 may also check to determine whether the edit operation (i.e., change to line 1) is or otherwise occurs in an existing dynamic region or within a threshold range of an existing dynamic region in the document. In an embodiment, the threshold range for a dynamic region may be defined by the following:

[region start value+region offset value−1, region end value+region offset value+1]

The threshold range specifies a number of lines from the actual start of the dynamic region and a number of lines from the actual end of the dynamic region in the document. For instance, according to the range specified above, the threshold range for a dynamic region is one line before the actual start of the dynamic region (region start value+region offset value−1) to one line following the actual end of the dynamic region (region end value+region offset value+1) in the document. If the edit is within the threshold range of a dynamic region, text editing application 502 processes the edit as if the edit results in a change within the dynamic region. In other embodiments, the threshold range may be a different number of lines, such as two, three, or any other suitable value, from the actual start and actual end of a dynamic region. Moreover, the threshold range may specify different number of lines from the actual start of a dynamic region and the actual end of the dynamic region. For example, a threshold range may specify one line from the actual start of a dynamic region and two lines from the actual end of the dynamic region.

At this point, since no dynamic regions have been created in the document, text editing application 502 may create a dynamic region A for this edit operation (i.e., change to line 1). To this end, as can be seen in FIG. 8A, text editing application 502 may create a dynamic region A data structure 804A, a dynamic region A undo stack 806A, and a dynamic region A redo stack 808A.

Dynamic region A data structure 804A defines dynamic region A created to host the edit to line 1. Accordingly, text editing application 502 may set the region start value to line 1 (RS: 1), the region end value to line 1 (RE: 1), and the region offset value to zero (Off: 0). In other words, at this point, dynamic region A includes only line 1. Text editing application 502 may push edit operation record 810 onto the top of dynamic region A undo stack 806A. As the last executed edit operation in dynamic region A, the edit operation (i.e., the change to line 1 as recorded in edit operation record 810) can be popped from the top of dynamic region A undo stack 806A and undone.

Figure 8B:
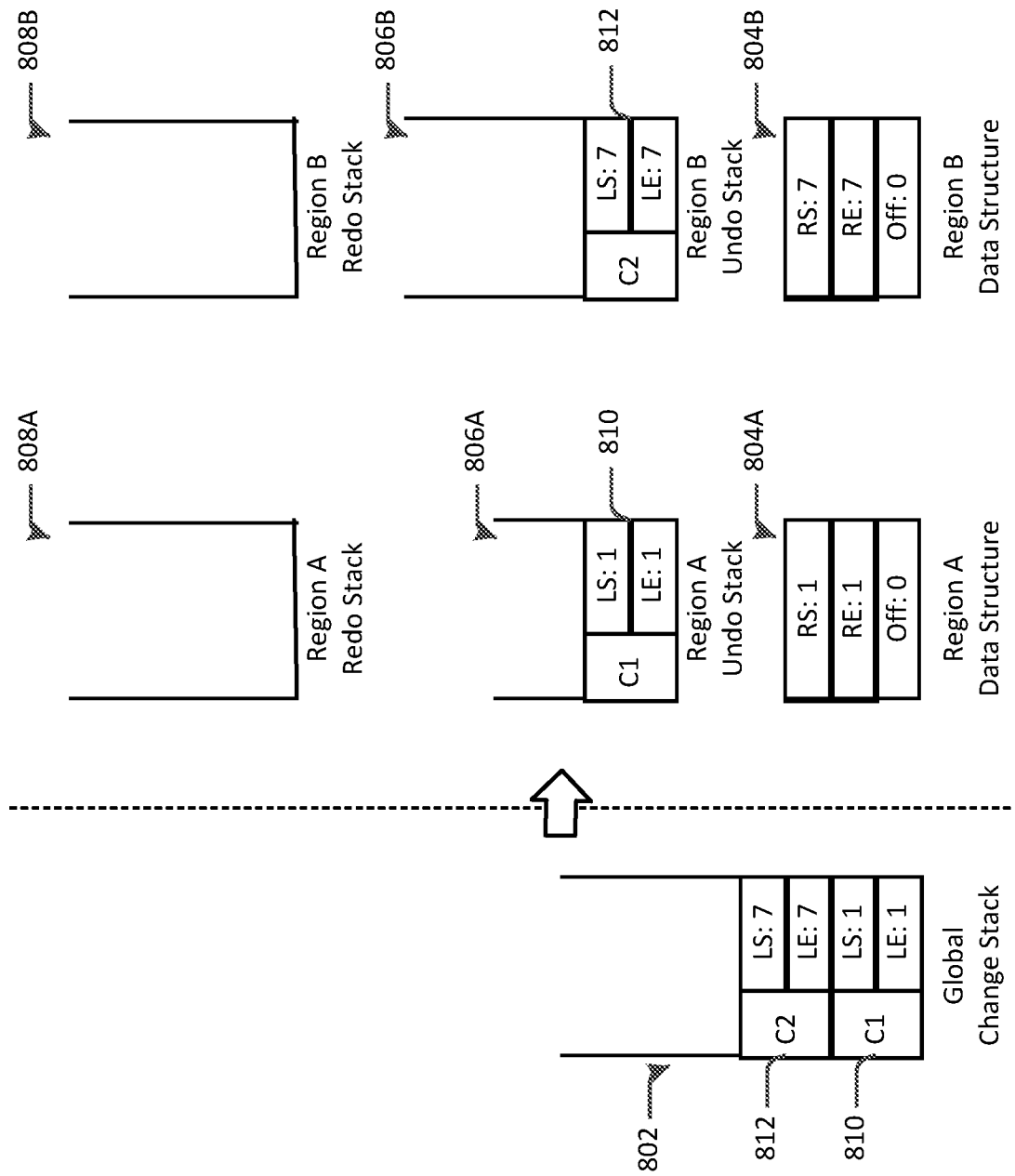

Continuing the example use case, the user may then make an edit to the text in line 7 of the document. In response to detecting the edit to line 7, text editing application 502 may create an edit operation record 812 to record the change to the document resulting from the edit to line 7. To this end, as can be seen in FIG. 8B, text editing application 502 may include in edit operation record 812 a description of the change to line 7 (denoted C2 in FIG. 8B), and set the line start value to line 7 (LS: 7) and the line end value to line 7 (LE: 7). Since the resulting change is to a single line (line 7), the line start value is the same as the line end value.

Text editing application 502 may check to determine whether the edit operation (i.e., change to line 7) is or otherwise occurs in an existing dynamic region or within a threshold range of an existing dynamic region in the document. At this point, the document includes dynamic region A as defined by dynamic region A data structure 804A. Text editing application 502 may determine that the changed line 7 is not in or within the threshold range of dynamic region A. As a result of this determination, text editing application 502 may create a dynamic region B for this edit operation (i.e., change to line 7). To this end, as can be seen in FIG. 8B, text editing application 502 may create a dynamic region B data structure 804B, a dynamic region B undo stack 806B, and a dynamic region B redo stack 808B. Dynamic region B data structure 804B defines dynamic region B created to host the edit to line 7. Accordingly, text editing application 502 may set the region start value to line 7 (RS: 7), the region end value to line 7 (RE: 7), and the region offset value to zero (Off: 0). In other words, at this point, dynamic region B includes only line 7. Text editing application 502 may push edit operation record 812 onto the top of dynamic region B undo stack 806B. As the last executed edit operation in dynamic region B, the edit operation (i.e., the change to line 7 as recorded in edit operation record 812) can be popped from the top of dynamic region B undo stack 806B and undone.

Note that since dynamic region A has its own dynamic region A undo stack 806A, the edit to line 1 recorded by edit operation record 810 can be popped from the top of dynamic region A undo stack 806A and undone without having to first undo the edit to line 7. Simply stated, since dynamic region A and dynamic region B have their own undo stack, the last edit operation performed in dynamic region A (change to line 1) can be undone even though the edit operation performed in dynamic region B (change to line 7) happens to be the last edit operation performed in the document. The result is the non-linear nature of undo operations across the dynamic regions in the document.

Figure 8C:
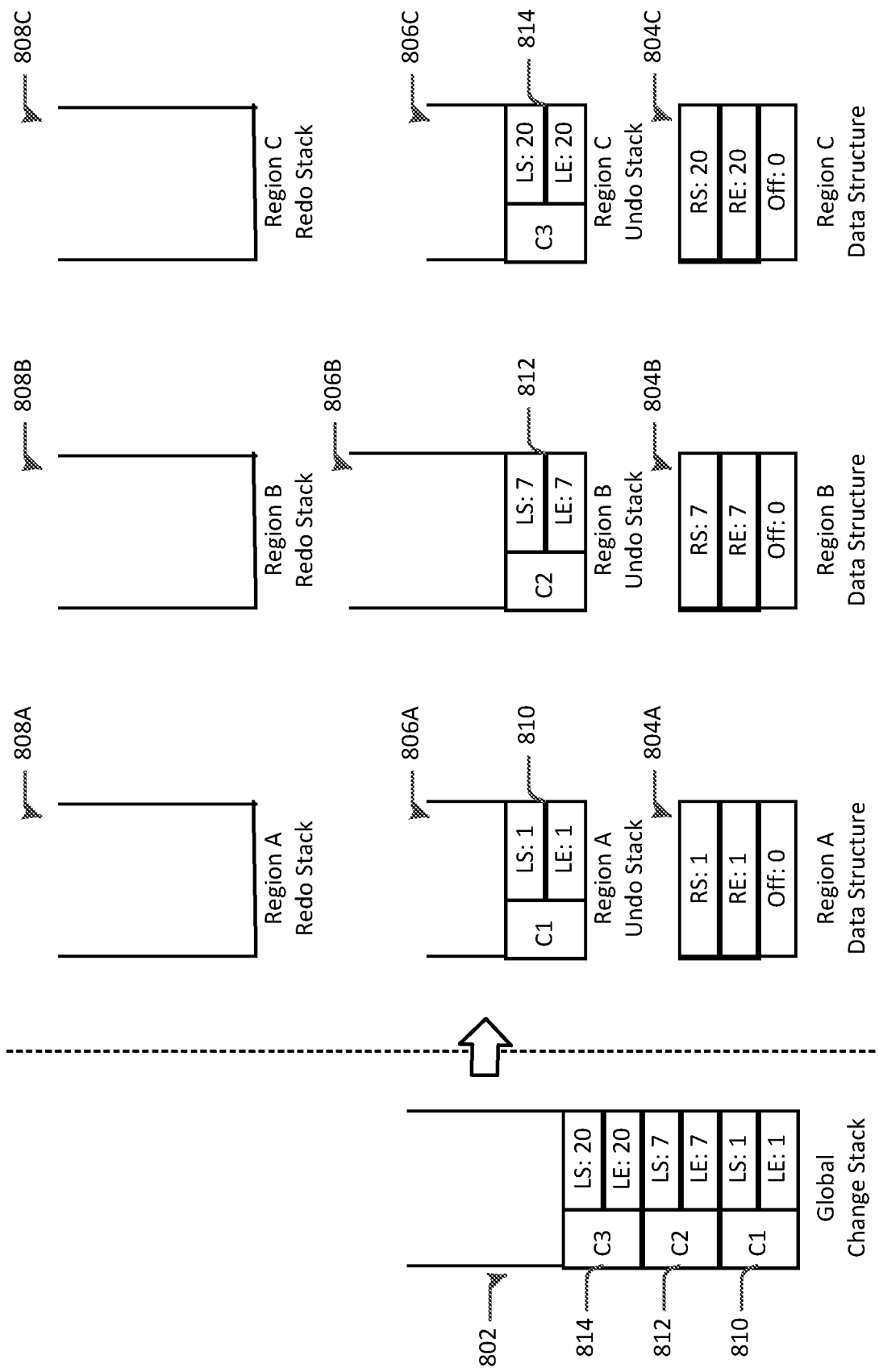

Continuing the example use case, the user may then make an edit to the text in line 20 of the document. In response to detecting the edit to line 20, text editing application 502 may create an edit operation record 814 to record the change to the document resulting from the edit to line 20. To this end, as can be seen in FIG. 8C, text editing application 502 may include in edit operation record 814 a description of the change to line 20 (denoted C3 in FIG. 8C), and set the line start value to line 20 (LS: 20) and the line end value to line 20 (LE: 20). Since the resulting change is to a single line (line 20), the line start value is the same as the line end value.

Text editing application 502 may check to determine whether the edit operation (i.e., change to line 20) is or otherwise occurs in an existing dynamic region or within a threshold range of an existing dynamic region in the document. At this point, the document includes dynamic region A as defined by dynamic region A data structure 804A and dynamic region B as defined by dynamic region B data structure 804B. Text editing application 502 may determine that the changed line 20 is not in or within the threshold range of either dynamic region A or dynamic region B. As a result of this determination, text editing application 502 may create a dynamic region C for this edit operation (i.e., change to line 20).

To this end, as can be seen in FIG. 8C, text editing application 502 may create a dynamic region C data structure 804C, a dynamic region C undo stack 806C, and a dynamic region C redo stack 808C. Dynamic region C data structure 804C defines dynamic region C created to host the edit to line 20. Accordingly, text editing application 502 may set the region start value to line 20 (RS: 20), the region end value to line 20 (RE: 20), and the region offset value to zero (Off: 0). In other words, at this point, dynamic region C includes only line 20. Text editing application 502 may push edit operation record 814 onto the top of dynamic region C undo stack 806C. As the last executed edit operation in dynamic region C, the edit operation (i.e., the change to line 20 as recorded in edit operation record 814) can be popped from the top of dynamic region C undo stack 806C and undone.

Note that since dynamic region A has its own dynamic region A undo stack 806A, the edit to line 1 recorded by edit operation record 810 can be popped from the top of dynamic region A undo stack 806A and undone without having to first undo the edit to line 20. Similarly, since dynamic region B has its own dynamic region B undo stack 806B, the edit to line 7 recorded by edit operation record 812 can be popped from the top of dynamic region B undo stack 806B and undone without having to first undo the edit to line 20. Simply stated, since dynamic region A, dynamic region B, and dynamic region C each have their own undo stack, the last edit operation performed in dynamic region A (change to line 1) and/or in dynamic region B (change to line 7) can be undone even though the edit operation performed in dynamic region C (change to line 20) happens to be the last edit operation performed in the document.

Continuing the example use case, the user may then make an edit to add a new line 3 in the document. For instance, to add a new line 3 in the document, the user can input or otherwise place a carriage return (e.g., line break) at the end of line 2 in the document. In other words, the addition of new line 3 in the document is a result of an edit to line 2 (to input the carriage return). In response to detecting the edit to lines 2 and 3, text editing application 502 may create an edit operation record 816 to record the change to the document resulting from the edit to lines 2 and 3.

Figure 8D:
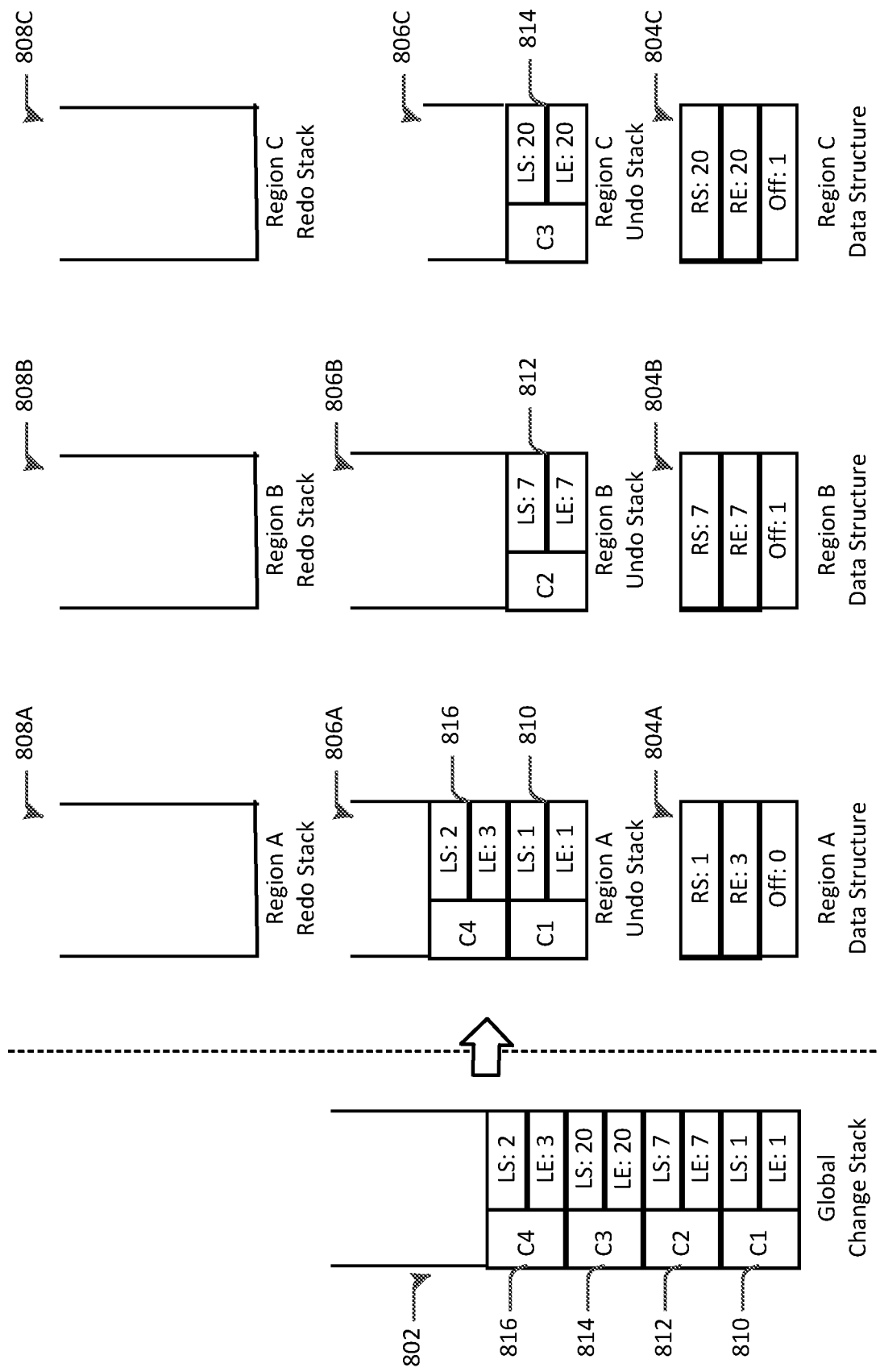

To this end, as can be seen in FIG. 8D, text editing application 502 may include in edit operation record 816 a description of the change to lines 2 and 3 (denoted C4 in FIG. 8D), and set the line start value to line 2 (LS: 2) and the line end value to line 3 (LE: 3). Line start value of 2 and line end value of 3 indicates that the edit to add new line 3 starts at line 2 in the document and ends at line 3 in the document. Note that the addition of new line 3 in the document causes the lines of text lower than new line 3 in the document (i.e., original lines 3 and higher) to shift down by one line.

Text editing application 502 may check to determine whether the edit operation (i.e., either change to line 2 or newly added line 3) is or otherwise occurs in an existing dynamic region or within a threshold range of an existing dynamic region in the document. At this point, the document includes dynamic region A as defined by dynamic region A data structure 804A, dynamic region B as defined by dynamic region B data structure 804B, and dynamic region C as defined by dynamic region C data structure 804C. Text editing application 502 may determine that the changed line 2 is within the threshold range of dynamic region A. More specifically, changed line 2 is within the threshold range of line 1 which is the actual end line number of dynamic region A as indicated by dynamic region A data structure 804A (i.e., RE: 1+Off: 0=line 1). As a result of this determination, as can be seen in FIG. 8D, text editing application 502 may push edit operation record 816 onto the top of dynamic region A undo stack 806A.

Note that the edit to add new line 3 in this manner added two lines to dynamic region A. That is, the edit to add new line 3 by changing line 2 to insert new line 3 causes an increase of two lines (lines 2 and 3) in dynamic region A. Accordingly, text editing application 502 may set the region end value to line 3 (RE: 3) in dynamic region A data structure 804A to indicate the new end location of dynamic region A as a result of the edit operation to add new line 3. As the last executed edit operation in dynamic region A, the edit operation (i.e., the change to lines 2 and 3 as recorded in edit operation record 816) can be popped from the top of dynamic region A undo stack 806A and undone. Note that the edit to line 1 recorded by edit operation record 810 cannot be undone since edit operation record 810 is no longer at the top of dynamic region A undo stack 806A. In order to undo the edit to line 1, the edit operation recorded in edit operation record 816 (i.e., the edit to add new line 3)

needs to be undone first, which will place edit operation record 810 at the top of dynamic region A undo stack 806A.

Since the edit operation resulted in an addition of lines to the document, text editing application 502 may check to determine whether a dynamic region in the document is located below dynamic region A, which now hosts the edit to include new line 3. At this point, other than dynamic region A, the document also includes dynamic region B as defined by dynamic region B data structure 804B and dynamic region C as defined by dynamic region C data structure 804C. Text editing application 502 may determine that both dynamic region B and dynamic region C are located below dynamic region A in the document. As a result of this determination, text editing application 502 may adjust the respective region offset values for dynamic region B and dynamic region C to account for the number of lines added in dynamic region A. For instance, since one line (i.e., a new line 3) was added to dynamic region A, text editing application 502 may increment or increase the region offset value in dynamic region B data structure 804B by one (i.e., from Off: 0 to Off: 1). Text editing application 502 may also increment or increase the region offset value in dynamic region C data structure 804C by one (i.e., from Off: 0 to Off: 1).

Continuing the example use case, the user may then make an edit to the text in line 21 of the document. Note that line 21 in the document was original line 20 prior to the user making the prior edit to add the new line 3 in the document. In response to detecting the edit to line 21, text editing application 502 may create an edit operation record 818 to record the change to the document resulting from the edit to line 21.

Figure 8E:
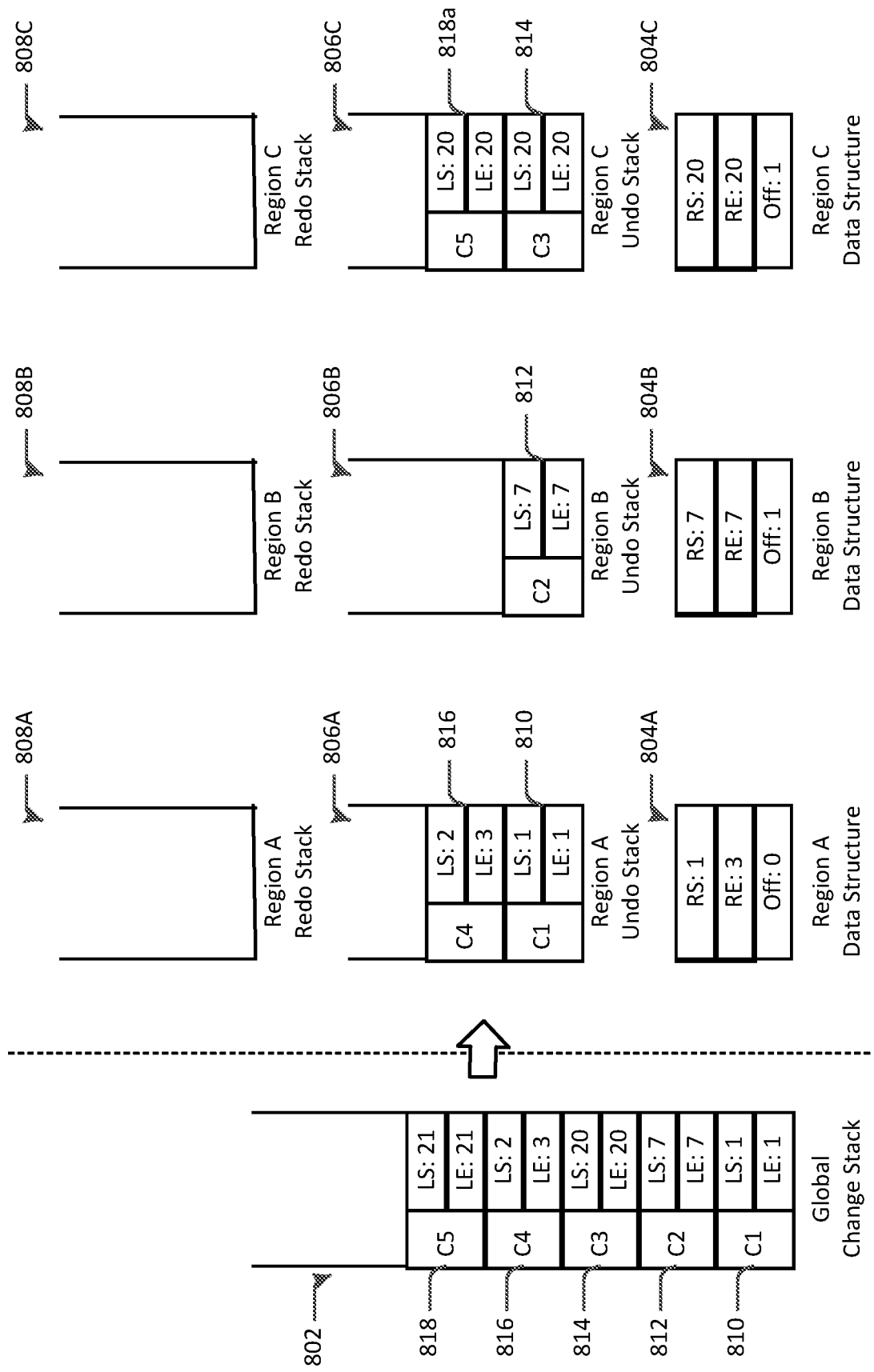

To this end, as can be seen in FIG. 8E, text editing application 502 may include in edit operation record 818 a description of the change to line 21 (denoted C5 in FIG. 8E), and set the line start value to line 21 (LS: 21) and the line end value to line 21 (LE: 21). Since the resulting change is to a single line (line 21), the line start value is the same as the line end value.

Text editing application 502 may check to determine whether the edit operation (i.e., change to line 21) is or otherwise occurs in an existing dynamic region or within a threshold range of an existing dynamic region in the document. At this point, the document includes dynamic region A as defined by dynamic region A data structure 804A, dynamic region B as defined by dynamic region B data structure 804B, and dynamic region C as defined by dynamic region C data structure 804C. Note that dynamic region A has a region offset value of zero (Off: 0), and dynamic region B and dynamic region C both have a region offset value of one (Off: 1). The non-zero region offset value affects the actual locations of dynamic region B and dynamic region C in the document. Due to the non-zero region offset value, the actual location of dynamic region B in the document starts at line 8 (i.e., actual start line number of RS: 7+Off: 1) and ends at line 8 (i.e., actual end line number of RE: 7+Off: 1), and the actual location of dynamic region C in the document starts at line 21 (i.e., actual start line number of RS: 20+Off: 1) and ends at line 21 (i.e., actual end line number of RE: 20+Off: 1). The actual location of dynamic region A in the document starts at line 1 (i.e., actual start line number of RS: 1+Off: 0) and ends at line 3 (i.e., actual end line number of RE: 3+Off: 0) as reflected by the current RS and RE values in dynamic region A data structure 804A. Based on the actual locations of the dynamic regions in the document, text editing application 502 may determine that the changed line 21 is in dynamic region C as indicated by dynamic region C data structure 804C. However, since the non-zero region offset value of dynamic region C affects the actual location of the edit operation to line 21, the location of the edit to line 21 as recorded in edit operation record 818 needs to be adjusted to account for the non-zero region offset value of dynamic region C. Hence, text editing application 502 may create an edit operation record 818*a* that reflects the appropriate adjustment to the line start value and the line end value.

As can be seen in FIG. 8E, text editing application 502 may include in edit operation record 818*a* a description of the change to line 21, and set the line start value to line 20 (i.e., decrease the line start value in edit operation record 818 by the number of lines added in dynamic region A) and the line end value to line 20 (i.e., decrease the line start value in edit operation record 818 by the number of lines added in dynamic region A). Text editing application 502 may push edit operation record 818*a* onto the top of dynamic region C undo stack 806C. As the last executed edit operation in dynamic region C, the edit operation (i.e., the change to line 20 as recorded in edit operation record 818*a*) can be popped from the top of dynamic region C undo stack 806C and undone. Note that the actual location of the edit operation is line 21 (i.e., RS: 20+Off: 1) because of the region offset value of one associated with dynamic region C.

The user may continue to make edits to the document during the document editing session. For example, as can be seen in FIGS. 9A and 9B, the user may make an edit to the document to delete line 13. In particular, as can be seen in FIG. 9A which shows a portion of the document before the user's edit, the document includes a line 13 which is a blank line (see reference numeral 902) between line 12 having the text "Environment:" (see reference numeral 904) and line 14 having the text "Kernel-mode Driver Framework" (see reference numeral 906). As can be seen in FIG. 9B which shows the portion of the document after the user's edit, the document no longer includes original line 13 (i.e., the blank line) that existed in the document before the edit to delete line 13. Rather, original line 14 having the text Kernel-mode Driver Framework" (see reference numeral 906) now immediately follows line 12 (see reference numeral 904) as new line 13. More generally, all the lines in the document located below deleted original line 13 move or shift up one line in the document.

To delete line 13 in the document, the user deleted or otherwise removed the carriage return (e.g., line break) which was at the end of line 12. In other words, the deletion of original line 13 in the document in a result of an edit to line 12 (to delete the carriage return) in the document. In an implementation, as shown in FIG. 9B, the change to line 12 may be indicated by a change bar 908 displayed in the margin of the document next to line 12. More generally, similar change bars may be displayed in the margin of the document to indicate the lines of text in the document that have changed during the editing session.

Figure 10:
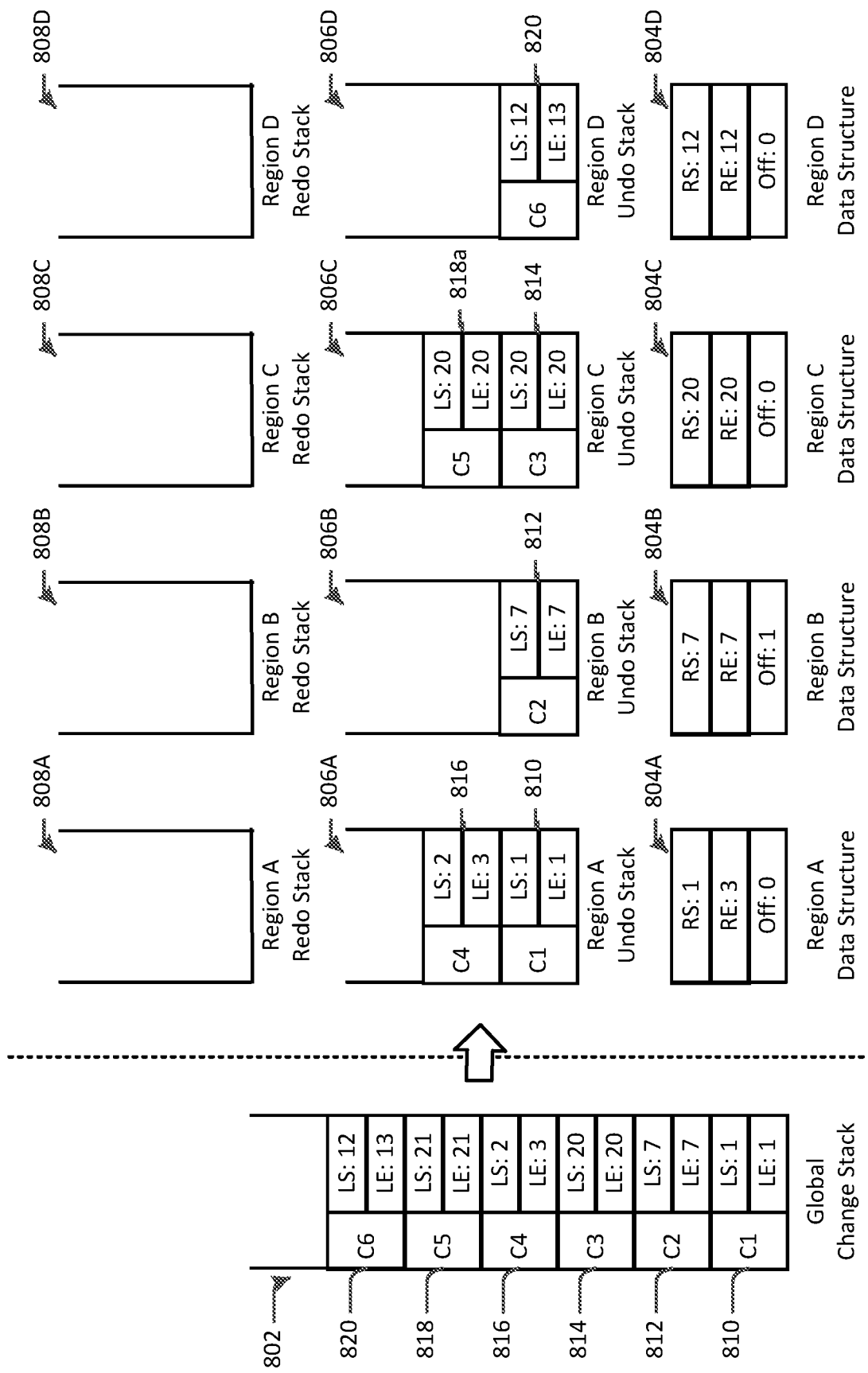
FIG. 10 is a diagram of an example operation of dynamic region data structures in processing a deletion of a line in a document, in accordance with an embodiment of the present disclosure.

Referring now to FIG. 10, in response to detecting the edit to line 12 and deleted original line 13, text editing application 502 may create an edit operation record 820 to record the change to the document. To this end, text editing application 502 may include in edit operation record 820 a description of the change to line 12 and deleted original line 13 (denoted C6 in FIG. 10), and set the line start value to line 12 (LS: 12) and the line end value to line 13 (LE: 13), which is the line that is deleted by the edit operation. Line start value of 12 and line end value of 13 indicates that the edit to delete original line 3 starts at line 12 in the document and ends at line 13 in the document.

Still referring to FIG. 10, text editing application 502 may check to determine whether the edit operation (i.e., either change to line 12 or deleted original line 13) is or otherwise occurs in an existing dynamic region in the document. At this point, the document includes dynamic region A as defined by dynamic region A data structure 804A, dynamic region B as defined by dynamic region B data structure 804B, and dynamic region C as defined by dynamic region C data structure 804C. As described previously, due to the non-zero region offset values, the actual location of dynamic region B in the document starts at line 8 (i.e., actual start line number of RS: 7+Off: 1) and ends at line 8 (i.e., actual end line number of RE: 7+Off: 1), and the actual location of dynamic region C in the document starts at line 21 (i.e., actual start line number of RS: 20+Off: 1) and ends at line 21 (i.e., actual end line number of RE: 20+Off: 1). The actual location of dynamic region A in the document starts at line 1 (i.e., actual start line number of RS: 1+Off: 0) and ends at line 3 (i.e., actual end line number of RE: 3+Off: 0) as reflected by the current RS and RE values in dynamic region A data structure 804A. Based on the actual locations of the dynamic regions in the document, text editing application 502 may determine that the changed line 12 or deleted original line 13 is not within dynamic region A, dynamic region B, or dynamic region C. As a result of this determination, text editing application 502 may create a dynamic region D for this edit operation (i.e., delete original line 13). To this end, text editing application 502 may create a dynamic region D data structure 804D, a dynamic region D undo stack 806D, and a dynamic region D redo stack 808D. Dynamic region D data structure 804D defines dynamic region D created to host the edit to line 12 to delete original line 13. Accordingly, text editing application 502 may set the region start value to line 12 (RS: 12), the region end value to line 12 (RE: 12), and the region offset value to zero (Off: 0). In other words, at this point, dynamic region D includes only line 12 which was changed to cause the deletion of original line 13. Text editing application 502 may push edit operation record 820 onto the top of dynamic region D undo stack 806D. As the last executed edit operation in dynamic region D, the edit operation (i.e., the change to line 12 to add a new line 13 as recorded in edit operation record 820) can be popped from the top of dynamic region D undo stack 806D and undone.

Since the edit operation to delete original line 13 resulted in a deletion of one line from the document, text editing application 502 may check to determine whether a dynamic region in the document is located below dynamic region D, which now hosts the edit to delete original line 13. At this point, other than dynamic region D, the document also includes dynamic region A as defined by dynamic region A data structure 804A, dynamic region B as defined by dynamic region B data structure 804B, and dynamic region C as defined by dynamic region C data structure 804C. Based on the actual locations of dynamic region A, dynamic region B, and dynamic region C, text editing application 502 may determine that dynamic region C is located below dynamic region D in the document. As a result of this determination, text editing application 502 may adjust the region offset value for dynamic region C to account for the number of lines deleted in the document by the edit operation hosted in dynamic region D. For instance, since one line (i.e., deletion of original line 13) was deleted in the document, text editing application 502 may decrease the region offset value in dynamic region C data structure 804C by one (i.e., from Off: 1 to Off: 0). Decreasing the region offset value of dynamic region C in this manner accounts for the upshifting of the lines of text included in dynamic region C as a result of the deletion of original line 13 as recorded in edit operation record 820.

Figure 11:
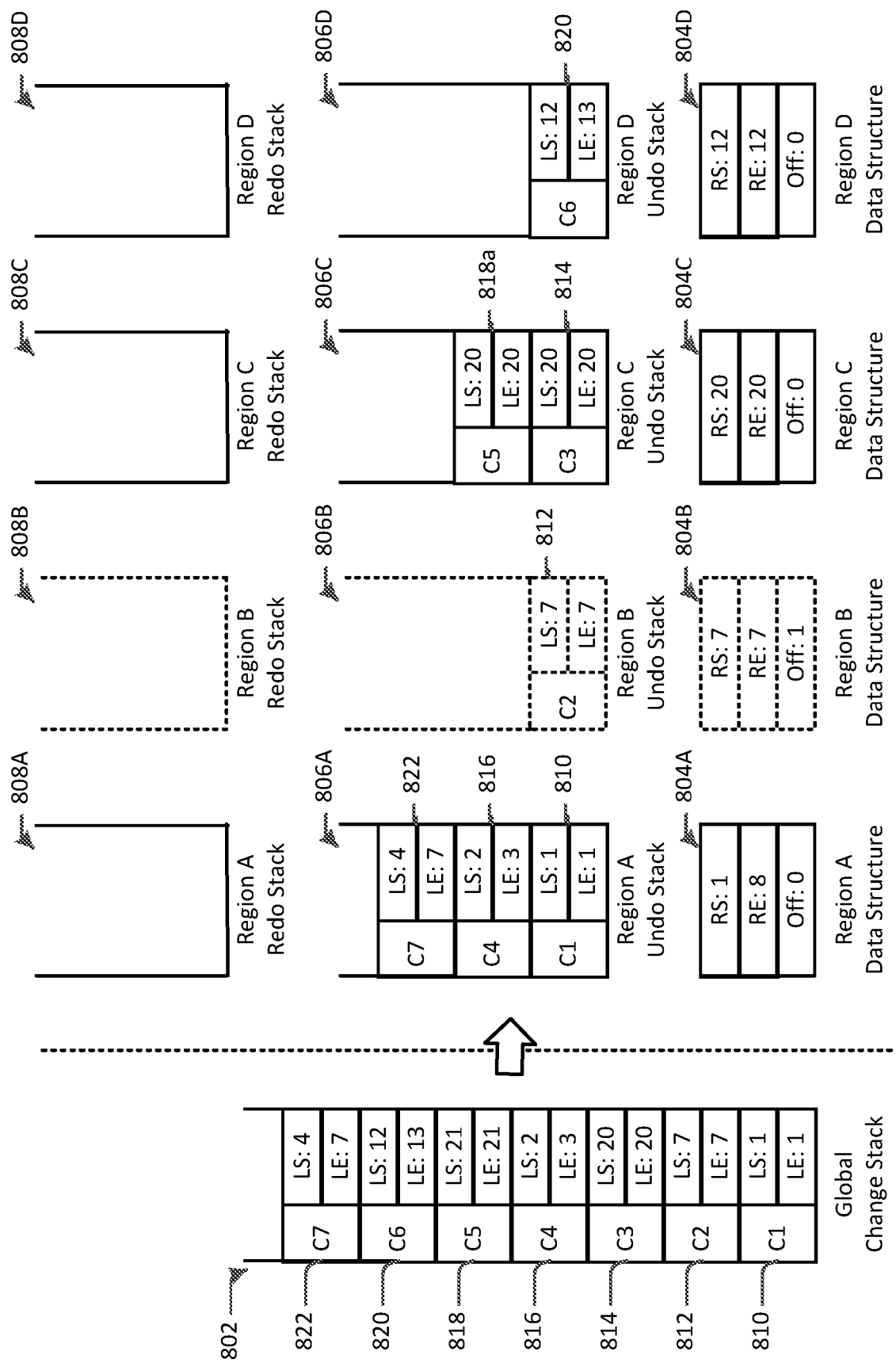
FIG. 11 is a diagram of an example operation of dynamic region data structures in processing an edit of multiple lines in a document, in accordance with an embodiment of the present disclosure.

Continuing the example use case, the user may then make an edit to the text in lines 4-7 of the document. Note that lines 4-7 in the document were original lines 3-6 prior to the user making the prior edit to add the new line 3 in the document. In response to detecting the edit to lines 4-7, text editing application 502 may create an edit operation record 822 to record the change to the document resulting from the edit to lines 4-7. To this end, as can be seen in FIG. 11, text editing application 502 may include in edit operation record 822 a description of the change to lines 4-7 (denoted C7 in FIG. 11), and set the line start value to line 4 (LS: 4) and the line end value to line 7 (LE: 7). Line start value of 4 and line end value of 7 indicates that the edit to lines 4-7 starts at line 4 in the document and ends at line 7 in the document.

Text editing application 502 may check to determine whether the edit operation (i.e., either change to line 4, line 5, line 6, or line 7) is or otherwise occurs in an existing dynamic region or within a threshold range of an existing dynamic region in the document. At this point, the document includes dynamic region A as defined by dynamic region A data structure 804A, dynamic region B as defined by dynamic region B data structure 804B, dynamic region C as defined by dynamic region C data structure 804C, and dynamic region D as defined by dynamic region D data structure 804D. Based on the actual locations of the dynamic regions in the document, text editing application 502 may determine that the changed line 4 is within the threshold range of dynamic region A. Text editing application 502 may determine also that the changed line 7 is within the threshold range of dynamic region B. In an implementation, in cases where an edit operation is within the threshold range of multiple dynamic regions in a document, text editing application 502 may select the dynamic region that is located higher in the document (i.e., the dynamic region with the smaller region start value). As a result of this determination, text editing application 502 may push edit operation record 822 onto the top of dynamic region A undo stack 806A. It will be appreciated in light of this disclosure that, in other implementations, text editing application 502 may select the dynamic region that is located lower in the document (i.e., the dynamic region with the higher region start value) or arbitrarily select a dynamic region from the multiple dynamic regions to host an edit operation that is within the threshold range of multiple dynamic regions.

Note that, since the edit operation (edit to the text in lines 4-7) and, more specifically, the changed line 7, is also within the threshold range of dynamic region B, the edit operation results in a merging of dynamic region A and dynamic region B. Since dynamic region A is selected to host the edit operation, dynamic region B can be treated as being merged into dynamic region A. To this end, the end location of dynamic region A is adjusted to reflect the combined scope of dynamic region A and dynamic region B. Here, because of the non-zero region offset value of dynamic region B (i.e., dynamic region B has a region offset value of 1), the actual location of dynamic region B in the document starts at line 8 (i.e., actual start line number of RS: 7+Off: 1) and ends at line 8 (i.e., actual end line number of RE: 7+Off: 1). Accordingly, as can be seen in FIG. 11, text editing application 502 may set the region end value to line 8 (RE: 8) in dynamic region A data structure 804A to indicate the new end location of dynamic region A as a result of the merging of dynamic region B into dynamic region A.

FIGS. 12A and 12B more clearly show an example of the merging of dynamic regions in a document. As can be seen in FIG. 12A which shows a portion of the document before the user's edit to lines 4-7 and resulting merging of dynamic region A and dynamic region B, the document includes dynamic region A (see reference numeral 1202) and dynamic region B (see reference numeral 1204). In an implementation, a change bar 1206 may be displayed in the margin of the document next to lines 1-3 to indicate that changes have been made to lines 1-3 in dynamic region A. Likewise, a change bar 1208 may be displayed in the margin of the document next to line 8 to indicate that changes have been made to line 8 in dynamic region B (as noted above, due to the non-zero region offset value, the actual location of dynamic region B in the document is line 8). As can be seen in FIG. 12B which shows the portion of the document after the user's edit to lines 4-7 and resulting merging of dynamic region A and dynamic region B, the document includes a new dynamic region A that includes dynamic region B (see reference numeral 1210). A change bar 1212 may be displayed in the margin of the document next to lines 1-8 to indicate that changes have been made to lines 1-8 in the new dynamic region A.

Referring again to FIG. 11, since the scope of dynamic region B is now covered by dynamic region A, text editing application 502 may treat dynamic region B as a dormant or inactive dynamic region in the document (e.g., as indicated by the dashed lines for dynamic region B data structure 804B, dynamic region B undo stack 806B, and dynamic region B redo stack 808B). As can be seen in FIG. 11, the values in dynamic region B data structure 804B and the contents of dynamic region B undo stack 806B and dynamic region B redo stack 808B remain unchanged. This allows dynamic region B to become active again once the edit operation (i.e., the edit to the text in lines 4-7 as recorded in edit operation record 822) that caused the merging of dynamic region B into dynamic region A is undone. For instance, popping edit operation record 822 from the top of dynamic region A undo stack 806A and undoing the change to lines 4-7 undoes the merging of dynamic region A and dynamic region B. In other words, undoing the change to lines 4-7 as recorded in edit operation record 822 causes dynamic region A to be split back into dynamic region A and dynamic region B.

Figure 13:
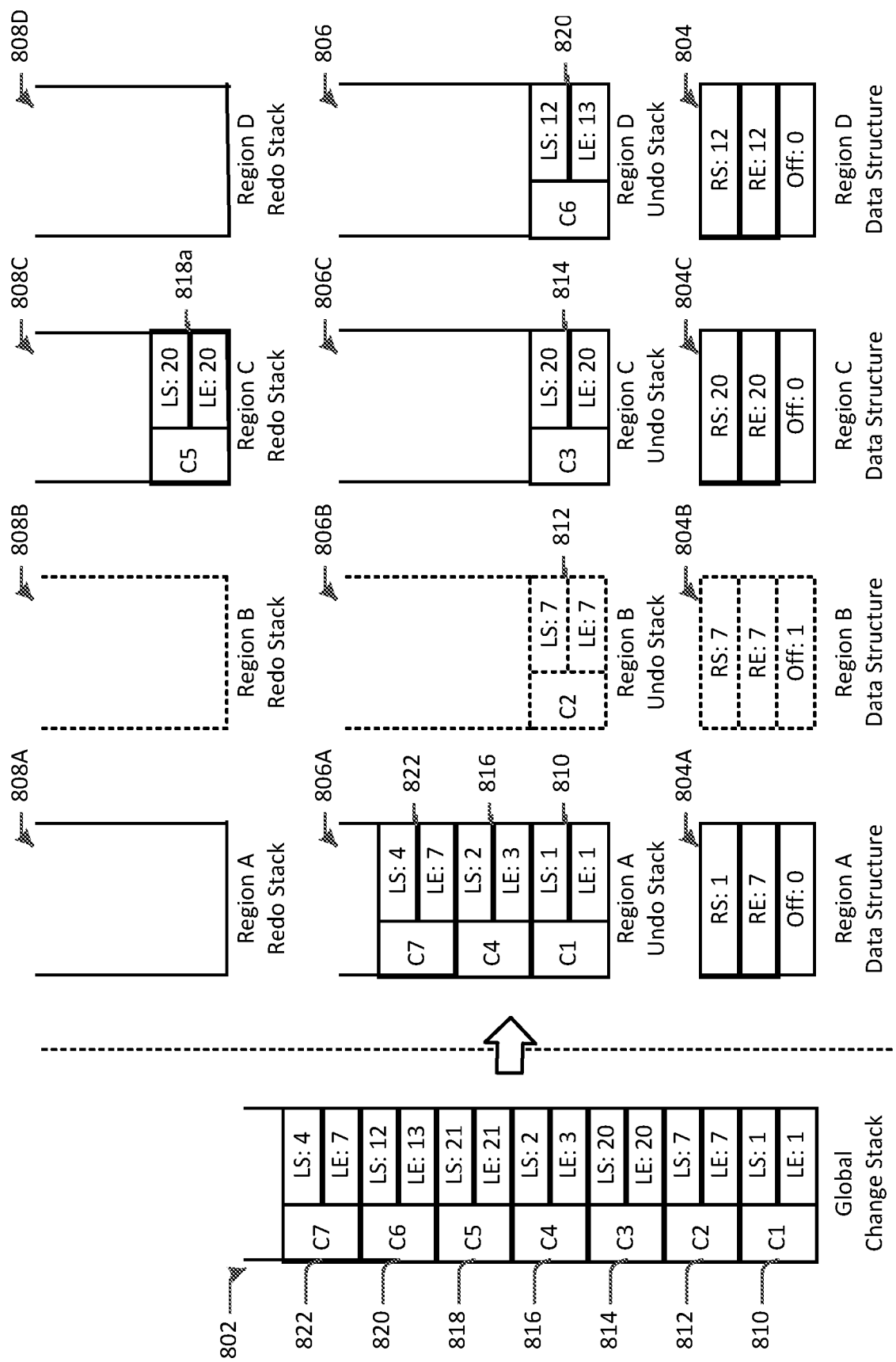
FIG. 13 is a diagram of an example operation of dynamic region data structures in processing an undo operation, in accordance with an embodiment of the present disclosure.

Continuing the example use case, the user may request an undo of an edit made in a particular dynamic region in the document. To trigger an undo action in a dynamic region, in an implementation, the user can use a pointing device or keyboard to move a cursor to a location near or next to the desired dynamic region (e.g., near or next to a change bar displayed next to the change lines). For example, the user may trigger an undo of an edit made in dynamic region C. Upon the user triggering the undo action, text editing application 502 may identify the particular dynamic region in which to perform the undo operation based on the location of the cursor. In this example case, text editing application 502 may identify dynamic region C as the dynamic region in which to perform the undo operation. To perform the undo operation in dynamic region C, as can be seen in FIG. 13, text editing application 502 may pop edit operation record 818a from the top of dynamic region C undo stack 806C, perform the inverse of the edit operation recorded in edit operation record 818a, and push edit operation record 818a onto the top of dynamic region C redo stack 808C. As previously described, edit operation record 818a recorded a change to line 21. As such, performing the inverse of the edit operation recorded in edit operation record 818a undoes the change made to line 21 at the time of performing the edit operation. However, at this point, the actual location in the document to perform the inverse of the recorded edit operation is indicated by the line start value in edit operation record 818a (LS: 20) and the line end value in edit operation record 818a (LE: 20) adjusted by the dynamic region C region offset value in dynamic region C data structure 804C (Off: 0). Based on these values, the actual location in the document to perform the inverse edit operation is line 20 (actual line numbers LS: 20+Off: 0 to LE:20+Off: 0). Computing the actual line number to perform the inverse of the recorded edit operation in this manner accounts for the upshifting of the lines of text included in dynamic region C as a result of the deletion of original line 13 as recorded in edit operation record 820. Since performing the inverse of the edit operation recorded in edit operation record 818a did not result in an addition or deletion of lines in the document, text editing application 502 does not have to check for dynamic regions located below dynamic region C in the document.

Figure 14:
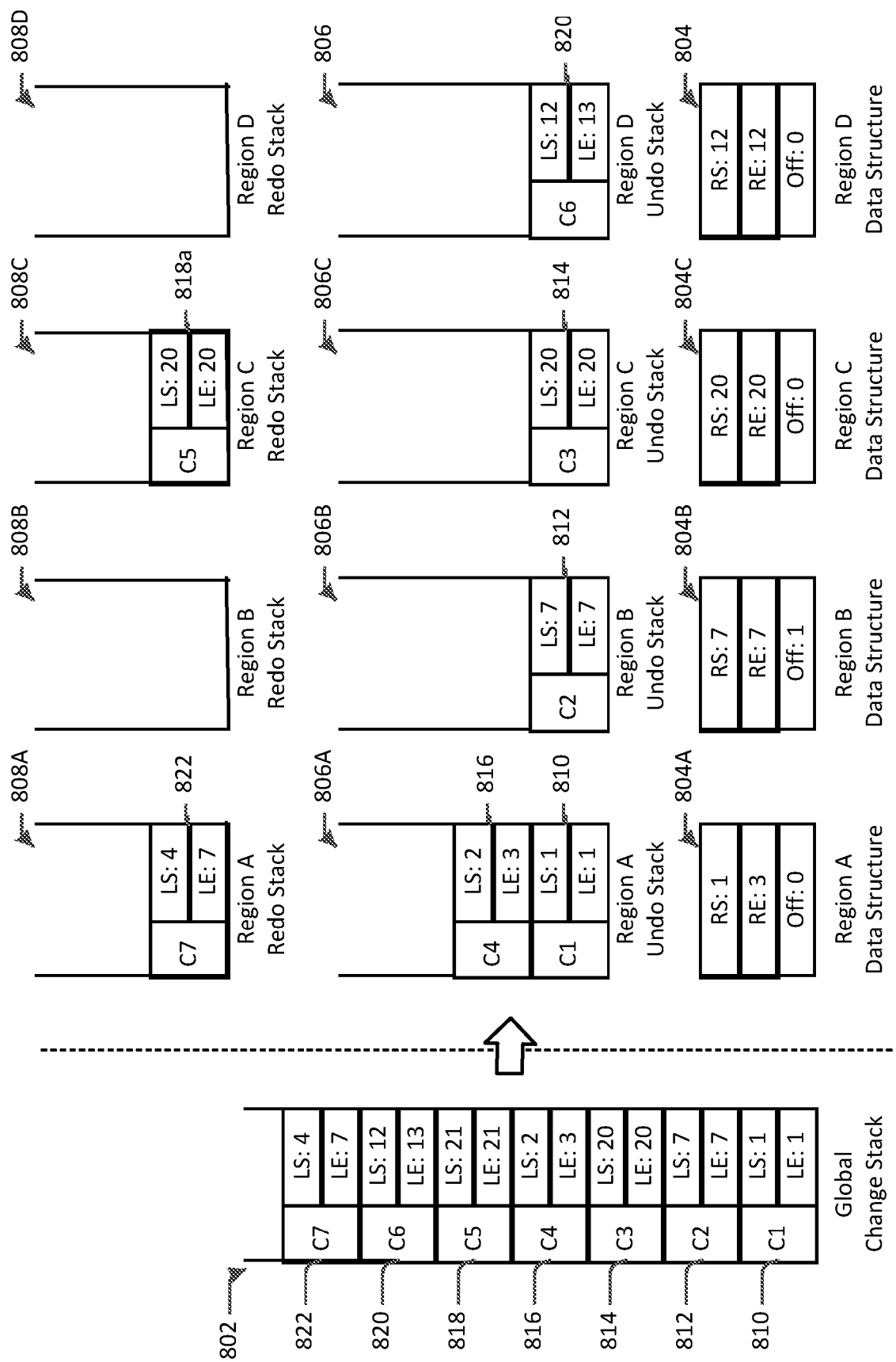
FIG. 14 is a diagram of an example operation of dynamic region data structures in processing another undo operation, in accordance with an embodiment of the present disclosure.

Continuing the example use case, the user may request an undo of an edit made in dynamic region A in the document. Upon the user triggering the undo action, text editing application 502 may identify dynamic region A as the dynamic region in which to perform the undo operation. To perform the undo operation in dynamic region A, as can be seen in FIG. 14, text editing application 502 may pop edit operation record 822 from the top of dynamic region A undo stack 806A, perform the inverse of the edit operation recorded in edit operation record 822, and push edit operation record 822 onto the top of dynamic region A redo stack 808A. As previously described, edit operation record 822 recorded a change to lines 4-7. As such, performing the inverse of the edit operation recorded in edit operation record 822 undoes the change made to lines 4-7 at the time of performing the edit operation. However, at this point, the actual location in the document to perform the inverse of the recorded edit operation is indicated by the line start value in edit operation record 822 (LS: 4) and the line end value in edit operation record 822 (LE: 7) adjusted by the dynamic region A region offset value in dynamic region A data structure 804A (Off: 0). Based on these values, the actual location in the document to perform the inverse edit operation is lines 4-7 (actual line numbers LS: 4+Off: 0 to LE:7+Off: 0). Computing the actual line number to perform the inverse of the recorded edit operation in this manner accounts for the upshifting of the lines of text included in dynamic region C as a result of the deletion of original line 13 as recorded in edit operation record 820. Since performing the inverse of the edit operation recorded in edit operation record 822 did not result in an addition or deletion of lines in the document, text editing application 502 does not have to check for dynamic regions located below dynamic region C in the document.

Note that undoing the changes to lines 4-7 as recorded in edit operation record 822 changes the scope of dynamic region A to no longer include lines 4-7. Note also that undoing the changes to lines 4-7 and thus removing lines 4-7 from the scope of dynamic region A undoes the merging of dynamic region A and dynamic region B. To this end, text editing application 502 may set the region end value to line 3 (RE: 3) in dynamic region A data structure 804A to indicate the separation or splitting of dynamic region B and the undoing of the changes to lines 4-7. Text editing application 502 may again treat dynamic region B as an active dynamic region in the document (e.g., as indicated by the solid lines for dynamic region B data structure 804B, dynamic region B undo stack 806B, and dynamic region B redo stack 808B).

It will be appreciated in light of this disclosure that a redo operation in a particular dynamic region may be processed by popping an edit operation record from the top of an undo stack for the particular dynamic region, performing the edit operation recorded in the popped edit operation record, and pushing the popped edit operation record onto the top of an undo stack for the particular dynamic region. As will be further described below at least in conjunction with FIG. 17, the redo operation may be processed in the same or substantially the same manner as edit operations and/or undo operations.

Figure 15:
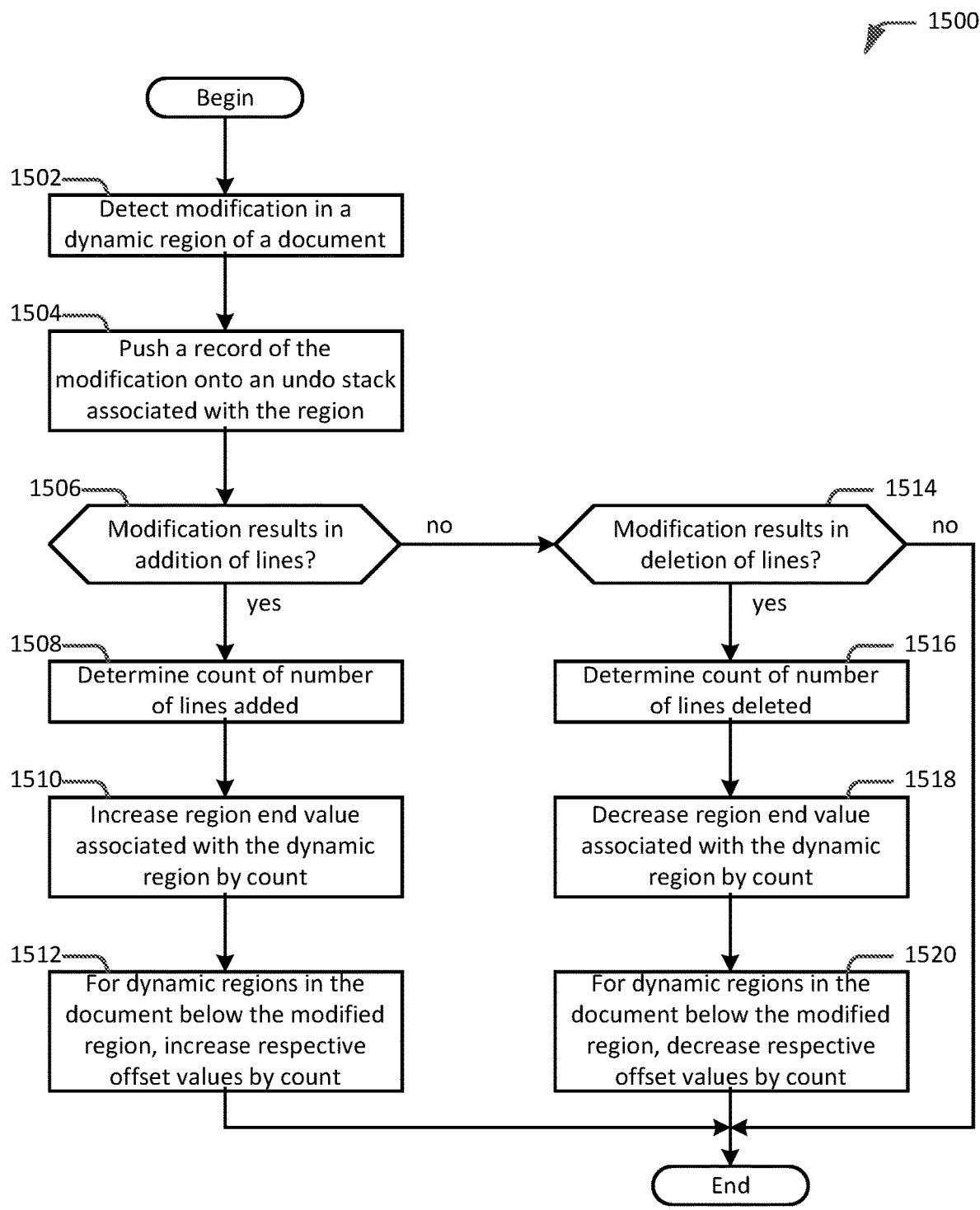
FIG. 15 is a flow diagram of an example process for processing a modification to a document, in accordance with an embodiment of the present disclosure.

FIG. 15 is a flow diagram of an example process 1500 for processing a modification to a document, in accordance with an embodiment of the present disclosure. Example process 1500, and example processes 1600 and 1700 further described below, may be implemented or used within a computing environment or system such as those disclosed above at least with respect to FIG. 2, FIG. 3, and/or FIGS. 4A-4C. For example, in some embodiments, the operations, functions, or actions illustrated in example process 1500, and example processes 1600 and 1700 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3 and/or clients 202 of FIGS. 4A-4C). In some embodiments, example process 1500, and example processes 1600 and 1700 further described below, may be implemented by application software, such as text editing application 502, which may run on a suitable computing device, such as computing device 100 of FIG. 2, client machines 102a-102n of FIG. 3, and/or clients 202 of FIGS. 4A-4C. For example, the operations, functions, or actions described in the respective blocks of example process 1500, and example processes 1600 and 1700 further described below, may be implemented by applications 116 and/or data 117 of computing device 100. Although the following description of processes 1500, 1600, and 1700 may refer to documents, it is appreciated herein that the processes can be applied to other types of text-based content.

With reference to FIG. 15, process 1500 is initiated and, at 1502, application software, such as text editing application 502, may detect a modification in a dynamic region in a document. For example, a user may be using text editing application to edit the contents of a document.

At 1504, text editing application 502 may create an edit operation record and record the modification to the document in the created edit operation record. Text editing application 502 may then push the created edit operation record onto an undo stack associated with the dynamic region in which the modification is made.

At 1506, text editing application 502 may check to determine whether the modification in the dynamic region causes or otherwise results in an addition of lines in the dynamic region. If the modification results in an addition of lines in the dynamic region, then, at 1508, text editing application 502 may compute or otherwise determine a count of the number of lines that are added by the modification.

At 1510, text editing application 502 may increase a region end value that indicates the end of the dynamic region in the document by the count of the number of lines added in the dynamic region by the modification. In an embodiment, text editing application 502 may maintain the dynamic region location information, including the region end value, in a dynamic region data structure.

At 1512, text editing application 502 may identify dynamic regions in the document located below the dynamic region in which the modification is made. For the identified dynamic regions, text editing application 502 may increase a respective region offset value for the dynamic regions by the count of the number of lines added in the dynamic region by the modification. The respective region offset values are used to resolve the edit dependency issue across the dynamic regions in the document. In an embodiment, text editing application 502 may maintain the region offset values in the respective dynamic region data structures created for the dynamic regions in the document. Process 1500 may then end.

If the modification does not result in an addition of lines in the dynamic region, then, at 1514, text editing application 502 may check to determine whether the modification in the dynamic region causes or otherwise results in a deletion of lines in the dynamic region. If the modification results in a deletion of lines in the dynamic region, then, at 1516, text editing application 502 may compute or otherwise determine a count of the number of lines that are deleted by the modification.

At 1518, text editing application 502 may decrease the region end value that indicates the end of the dynamic region in the document by the count of the number of lines deleted in the dynamic region by the modification. At 1520, text editing application 502 may identify dynamic regions in the document located below the dynamic region in which the modification is made. For the identified dynamic regions, text editing application 502 may decrease the respective region offset value for the dynamic regions by the count of the number of lines deleted in the dynamic region by the modification. Process 1500 may then end.

Otherwise, if, at 1514, the modification does not result in a deletion of lines in the dynamic region, process 1500 may end. In this case, since the modification does not result in either an addition of lines or a deletion of lines in the dynamic region, no adjustment of the region end value of the dynamic region or the region offset values for the dynamic regions located below the dynamic region in which the modification is made is needed.

Figure 16:
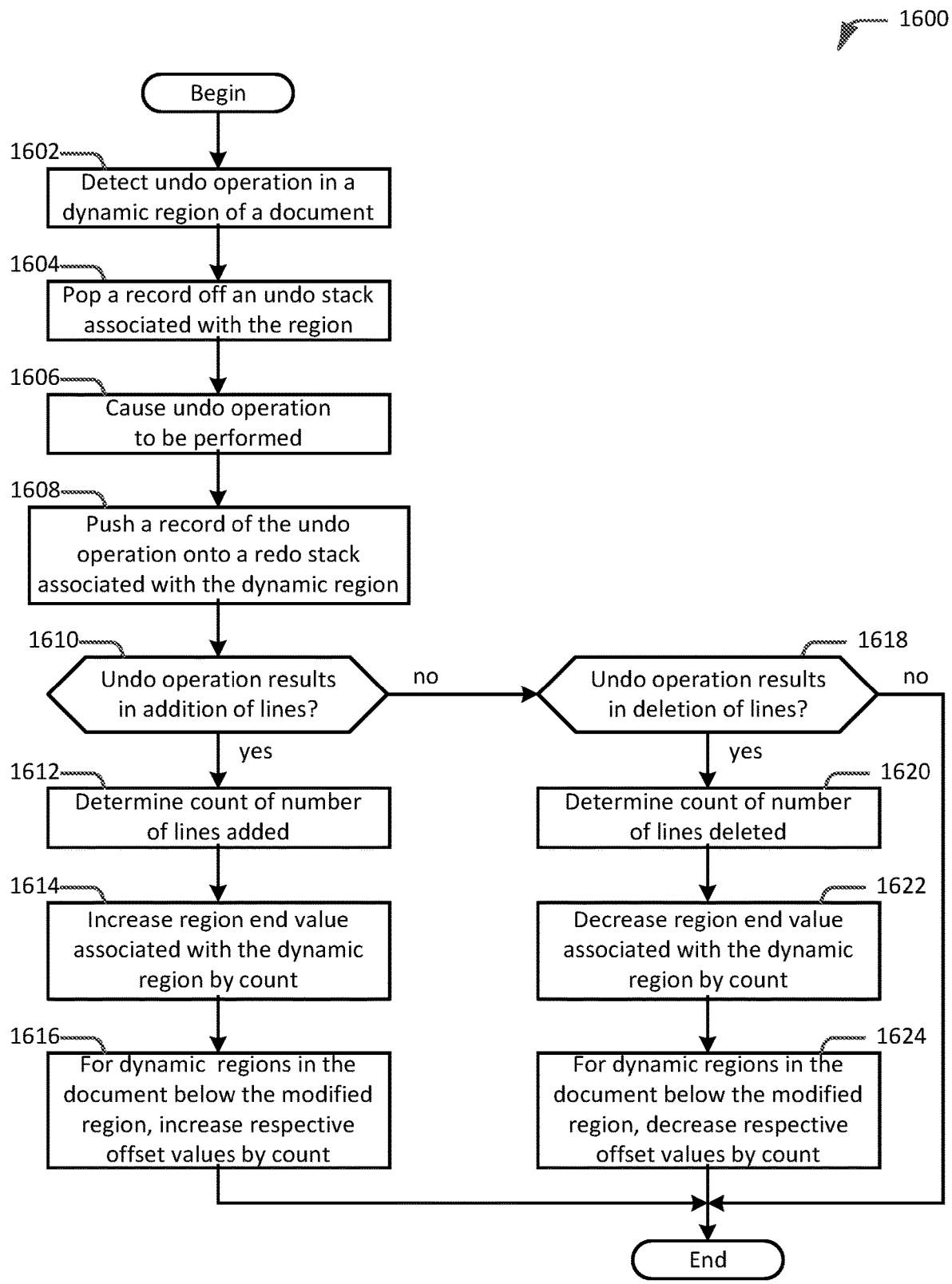
FIG. 16 is a flow diagram of an example process for processing an undo operation, in accordance with an embodiment of the present disclosure.

FIG. 16 is a flow diagram of an example process 1600 for processing an undo operation, in accordance with an embodiment of the present disclosure. Process 1600 is initiated and, at 1602, application software, such as text editing application 502, may detect an undo operation in a dynamic region in a document. For example, a user may be using text editing application to edit the contents of a document and, during an editing session, trigger an undo action in the dynamic region in the document.

At 1604, text editing application 502 may pop an edit operation record from the top of an undo stack associated with the dynamic region in which the undo action is detected. The edit operation record may record a prior modification made to the document. At 1606, text editing application 502 may cause the undo operation to be performed. More specifically, text editing application 502 may cause an inverse of the modification recorded in the popped edit operation record to be performed. At 1608, text editing application 502 may push the popped edit operation record onto a redo stack associated with the dynamic region in which the undo action is detected.

At 1610, text editing application 502 may check to determine whether the undo operation in the dynamic region causes or otherwise results in an addition of lines in the dynamic region. If the undo operation results in an addition of lines in the dynamic region, then, at 1612, text editing application 502 may compute or otherwise determine a count of the number of lines that are added by the undo operation.

At 1614, text editing application 502 may increase a region end value that indicates the end of the dynamic region in the document by the count of the number of lines added in the dynamic region by the undo operation. In an embodiment, text editing application 502 may maintain the dynamic region location information, including the region end value, in a dynamic region data structure.

At 1616, text editing application 502 may identify dynamic regions in the document located below the dynamic region in which the undo operation is performed. For the identified dynamic regions, text editing application 502 may increase a respective region offset value for the dynamic regions by the count of the number of lines added in the dynamic region by the undo operation. In an embodiment, text editing application 502 may maintain the region offset values in the respective dynamic region data structures created for the dynamic regions in the document. Process 1600 may then end.

If the undo operation does not result in an addition of lines in the dynamic region, then, at 1618, text editing application 502 may check to determine whether the undo operation in the dynamic region causes or otherwise results in a deletion of lines in the dynamic region. If the undo operation results in a deletion of lines in the dynamic region, then, at 1620, text editing application 502 may compute or otherwise determine a count of the number of lines that are deleted by the undo operation.

At 1622, text editing application 502 may decrease the region end value that indicates the end of the dynamic region in the document by the count of the number of lines deleted in the dynamic region by the undo operation. At 1624, text editing application 502 may identify dynamic regions in the document located below the dynamic region in which the undo operation is performed. For the identified dynamic regions, text editing application 502 may decrease the respective region offset value for the dynamic regions by the count of the number of lines deleted in the dynamic region by the undo operation. Process 1600 may then end.

Otherwise, if, at 1618, the undo operation does not result in a deletion of lines in the dynamic region, process 1600 may end. In this case, since the performance of the undo operation does not result in either an addition of lines or a deletion of lines in the dynamic region, no adjustment of the region end value of the dynamic region or the region offset values for the dynamic regions located below the dynamic region in which the undo operation is performed is needed.

Figure 17:
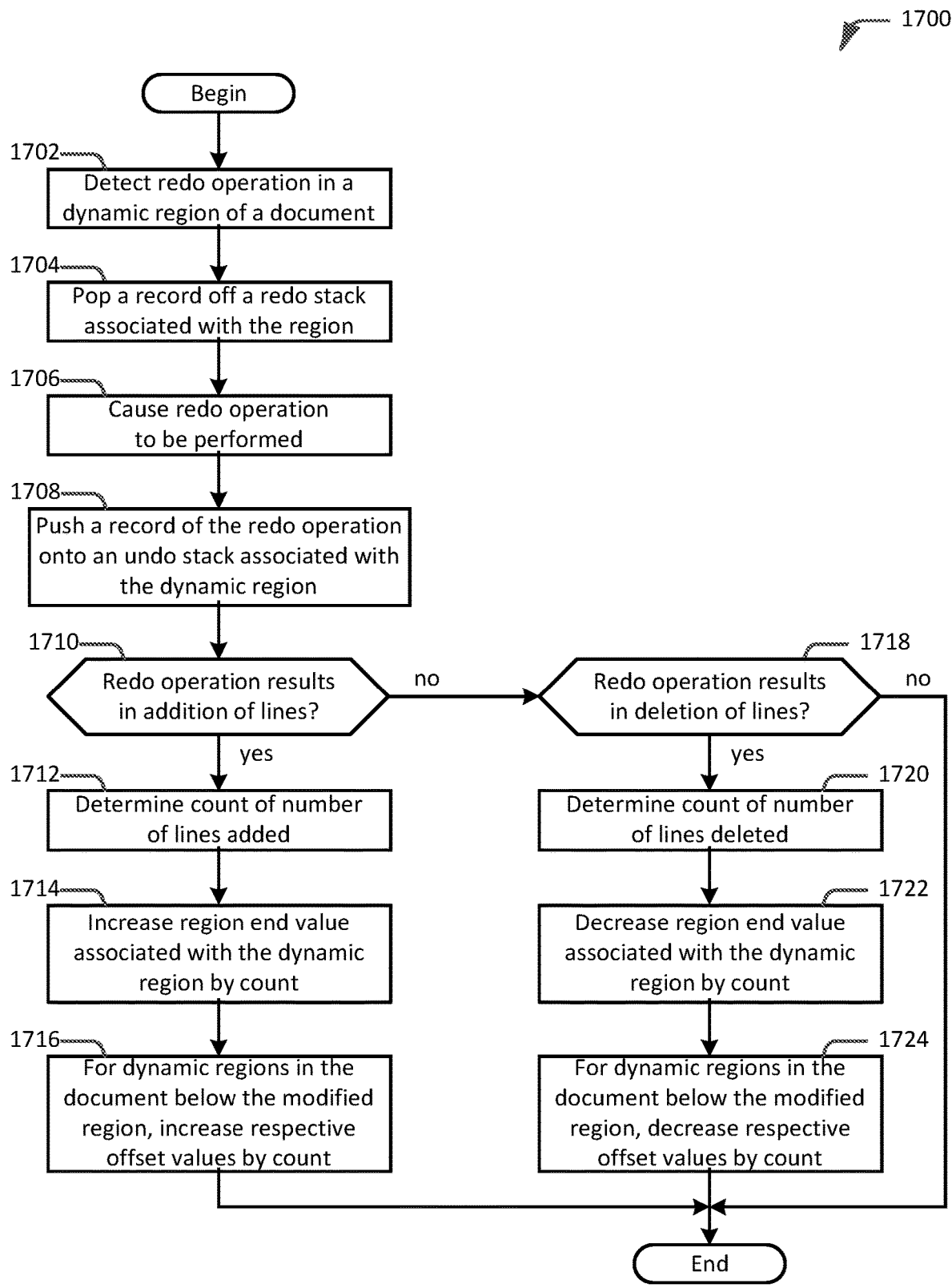
FIG. 17 is a flow diagram of an example process for processing a redo operation, in accordance with an embodiment of the present disclosure.

FIG. 17 is a flow diagram of an example process 1700 for processing a redo operation, in accordance with an embodiment of the present disclosure. Process 1700 is initiated and, at 1702, application software, such as text editing application 502, may detect a redo operation in a dynamic region in a document. For example, a user may be using text editing application to edit the contents of a document and, during an editing session, trigger a redo action in the dynamic region in the document.

At 1704, text editing application 502 may pop an edit operation record from the top of a redo stack associated with the dynamic region in which the redo action is detected. The edit operation record may record a prior modification made to the document and which was previously undone by execution of an undo operation. At 1706, text editing application 502 may cause the redo operation to be performed. More specifically, text editing application 502 may cause the previously undone operation to be redone. At 1708, text editing application 502 may push the popped edit operation record onto an undo stack associated with the dynamic region in which the redo action is detected.

At 1710, text editing application 502 may check to determine whether the redo operation in the dynamic region causes or otherwise results in an addition of lines in the dynamic region. If the redo operation results in an addition of lines in the dynamic region, then, at 1712, text editing application 502 may compute or otherwise determine a count of the number of lines that are added by the redo operation.

At 1714, text editing application 502 may increase a region end value that indicates the end of the dynamic region in the document by the count of the number of lines added in the dynamic region by the redo operation. In an embodiment, text editing application 502 may maintain the dynamic region location information, including the region end value, in a dynamic region data structure.

At 1716, text editing application 502 may identify dynamic regions in the document located below the dynamic region in which the redo operation is performed. For the identified dynamic regions, text editing application 502 may increase a respective region offset value for the dynamic regions by the count of the number of lines added in the dynamic region by the redo operation. In an embodiment, text editing application 502 may maintain the region offset values in the respective dynamic region data structures created for the dynamic regions in the document. Process 1700 may then end.

If the redo operation does not result in an addition of lines in the dynamic region, then, at 1718, text editing application 502 may check to determine whether the redo operation in the dynamic region causes or otherwise results in a deletion of lines in the dynamic region. If the redo operation results in a deletion of lines in the dynamic region, then, at 1720, text editing application 502 may compute or otherwise determine a count of the number of lines that are deleted by the redo operation.

At 1722, text editing application 502 may decrease the region end value that indicates the end of the dynamic region in the document by the count of the number of lines deleted in the dynamic region by the redo operation. At 1724, text editing application 502 may identify dynamic regions in the document located below the dynamic region in which the redo operation is performed. For the identified dynamic regions, text editing application 502 may decrease the respective region offset value for the dynamic regions by the count of the number of lines deleted in the dynamic region by the redo operation. Process 1700 may then end.

Otherwise, if, at 1718, the redo operation does not result in a deletion of lines in the dynamic region, process 1700 may end. In this case, since the performance of the redo operation does not result in either an addition of lines or a deletion of lines in the dynamic region, no adjustment of the region end value of the dynamic region or the region offset values for the dynamic regions located below the dynamic region in which the redo operation is performed is needed.

Further Example Embodiments

The following examples pertain to further embodiments, from which numerous permutations and configurations will be apparent.

Example 1 includes a method including: providing a data structure for a region of a document, the data structure including a start value, an end value, and an offset value that define the region within the document; and, responsive to detection of a modification of content within the region, determining a count of the number of lines of the document within the region; adjusting at least one of the start value, the end value, and the offset value of the region to change an area of the region based on the count of the number of lines; and pushing a record of the modification onto a stack of the region in response to the modification of content within the region, the stack configured to receive elements representative of individual actions to be performed on content within the region of the document, so as to enable the modification to be undone or redone in a non-linear fashion.

Example 2 includes the subject matter of Example 1, wherein the modification results in an addition of at least one line in the region.

Example 3 includes the subject matter of Example 1, wherein the modification results in a deletion of at least one line in the region.

Example 4 includes the subject matter of any of Examples 1 through 3, wherein the stack is one of an undo stack or a redo stack.

Example 5 includes the subject matter of any of Examples 1 through 4, wherein the modification is an undo operation and the stack is a redo stack.

Example 6 includes the subject matter of any of Examples 1 through 4, wherein the modification is a redo operation and the stack is an undo stack.

Example 7 includes the subject matter of any of Examples 1 through 6, further including: responsive to detection of a modification of content that adds or deletes at least one line within a second region of the document located above the first region of the document, adjusting the offset value of the first region to change an area of the first region based on the modification of content within the second region.

Example 8 includes the subject matter of any of Examples 1 through 7, wherein the modification results in a merging of an adjacent region of the document and the region.

Example 9 includes a system including a memory and one or more processors in communication with the memory and configured to: provide a data structure for a region of a document, the data structure including a start value, an end value, and an offset value that define the region within the document; and, responsive to detection of a modification of content within the region, determine a count of the number of lines of the document within the region; adjust at least one of the start value, the end value, and offset value of the region to change an area of the region based on the count of the number of lines; and push a record of the modification onto a stack of the region in response to the modification of content within the region, the stack configured to receive elements representative of individual actions to be performed on content within the region of the document, so as to enable the modification to be undone or redone in a non-linear fashion.

Example 10 includes the subject matter of Example 9, wherein the modification is an undo operation and the stack is a redo stack.

Example 11 includes the subject matter of Example 9, wherein the modification is a redo operation and the stack is an undo stack.

Example 12 includes the subject matter of any of Examples 9 through 11, wherein the modification results in an addition of at least one line in the region.

Example 13 includes the subject matter of any of Examples 9 through 11, wherein the modification results in a deletion of at least one line in the region.

Example 14 includes the subject matter of any of Examples 9 through 13, the one or more processors further configured to: responsive to detection of a modification of content that adds or deletes at least one line within a second region of the document located above the first region of the document, adjust the offset value of the first region to change an area of the first region based on the modification of content within the second region.

Example 15 includes the subject matter of any of Examples 9 through 14, wherein the modification results in a merge of an adjacent region of the document and the region.

Example 16 includes a method including: providing a first data structure for a first region of a document, the first data structure including a start value, an end value, and an offset value that define the first region within the document; providing a second data structure for a second region of a document below the first region, the second data structure including a start value, an end value, and an offset value that define the second region within the document; and, responsive to detection of a modification of content within the first region, determining a count of the number of lines added or deleted in the first region; adjusting at least one of the start value and the end value of the of the first region based on the modification of content within the first region; and adjusting the offset value of the second region to change an area of the second region based on the count of the number of lines added or deleted in the first region.

Example 17 includes the subject matter of Example 16, further including: responsive to detection of the modification of content within the first region, pushing a record of the modification onto a stack of the first region in response to the modification of content within the first region, the stack configured to receive elements representative of individual actions to be performed on content within the first region of the document, so as to enable the modification to be undone or redone in a non-linear fashion.

Example 18 includes the subject matter of any of Examples 16 and 17, wherein the stack is an undo stack.

Example 19 includes the subject matter of any of Examples 16 and 17, wherein the stack is a redo stack.

Example 20 includes the subject matter of any of Examples 16 through 19, wherein the modification results in an addition of at least one line in the region.

Example 21 includes the subject matter of any of Examples 16 through 19, wherein the modification results in a deletion of at least one line in the region.

Example 22 includes the subject matter of any of Examples 16 through 21, wherein the modification results in a merging of the first region and the second region.

Example 23 includes a system including a memory and one or more processors in communication with the memory and configured to: provide a first data structure for a first region of a document, the first data structure including a start value, an end value, and an offset value that define the first region within the document; provide a second data structure for a second region of a document below the first region, the second data structure including a start value, an end value, and an offset value that define the second region within the document; and, responsive to detection of a modification of content within the first region, determine a count of the number of lines added or deleted in the first region; adjust at least one of the start value and the end value of the of the first region based on the modification of content within the first region; and adjust the offset value of the second region to change an area of the second region based on the count of the number of lines added or deleted in the first region.

Example 24 includes the subject matter of Example 23, the one or more processors further configured to: responsive to detection of the modification of content within the first region, push a record of the modification onto a stack of the first region in response to the modification of content within the first region, the stack configured to receive elements representative of individual actions to be performed on content within the first region of the document, so as to enable the modification to be undone or redone in a non-linear fashion.

Example 25 includes the subject matter of any of Examples 23 and 24, wherein the stack is an undo stack.

Example 26 includes the subject matter of any of Examples 23 and 24, wherein the stack is a redo stack.

Example 27 includes the subject matter of any of Examples 23 through 26, wherein the modification results in an addition of at least one line in the region.

Example 28 includes the subject matter of any of Examples 23 through 26, wherein the modification results in a deletion of at least one line in the region.

Example 29 includes the subject matter of any of Examples 23 through 28, wherein the modification results in a merging of the first region and the second region.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
responsive to a modification of content within a region of a document:
providing a data structure including one or more values that define the region within the document, the one or more values including an offset value to enable non-linear undo operations across the region and another region within the document; and
recording the modification using the data structure provided for the region.

2. The method of claim 1, further comprising:
providing one or more stacks configured to receive elements representative of individual actions to be performed on content within the region of the document, the one or more stacks enabling linear undo operations within the region; and
responsive to another modification of content within the region of a document, recording the modification using the one or more stacks provided for the region.

3. The method of claim 1, wherein the modification results in an addition of at least one line of content in the region.

4. The method of claim 1, wherein the modification results in a deletion of at least one line of content in the region.

5. The method of claim 1, wherein the another region of the document is located above the region, the method further comprising:
responsive to detection of a modification of content that adds or deletes at least one line of content within the another region of the document, adjusting the offset value of the region to change an area of the region based on the modification of content within the another region.

6. The method of claim 1, wherein the modification results in a merging of an adjacent region of the document and the region.

7. A method comprising:
responsive to a redo operation within a region of a document:
removing a record from a redo stack configured to receive elements representative of individual actions to be performed on content within the region of the document;
performing a redo operation associated with the record removed from the redo stack, the redo operation causing a modification of content within the region; and
recording the modification using a data structure including one or more values that define the region within the document, the one or more values including an offset value that enables non-linear undo operations across the region and another region within the document.

8. The method of claim 7, further comprising adding a record of the redo operation onto an undo stack configured to receive elements representative of individual actions to be performed on content within the region of the document.

9. The method of claim 7, wherein the redo operation results in addition of at least one line of content within the region, the method further comprising:
determining a count of a number of lines of content added within the region; and
increasing a region end value based on the count of the number of lines, the region end value being one of the values that define the region.

10. The method of claim 7, wherein the redo operation results in deletion of at least one line of content within the region, the method further comprising:
determining a count of a number of lines of content deleted within the region; and
decreasing a region end value based on the count of the number of lines, the region end value being one of the values that define the region.

11. The method of claim 7, wherein the another region of the document is located above the region, the method further comprising:
responsive to detection of a modification of content that adds or deletes at least one line of content within the another region of the document, adjusting the offset value of the region to change an area of the region based on the modification of content within the another region.

12. The method of claim 7, wherein the redo operation results in a merging of an adjacent region of the document and the region.

13. The method of claim 8, further comprising:
responsive to an undo operation within the region of the document:
removing a record from the undo stack configured to receive elements representative of individual actions to be performed on content within the region of the document;
performing an undo operation associated with the record removed from the undo stack, the undo operation causing a modification of content within the region; and
recording the modification using the data structure for the region.

14. The method of claim 13, further comprising adding a record of the undo operation onto the undo stack configured to receive elements representative of individual actions to be performed on content within the region of the document.

15. The method of claim 13, wherein the undo operation results in a merging of an adjacent region of the document and the region.

16. A method comprising:
responsive to a modification of content within a region of a document:
a data structure including one or more values that define the region within the document, the one or more values including an offset value to enable non-linear undo operations across the region and another region within the document;
providing one or more stacks configured to receive elements representative of individual actions to be performed on content within the region of the document, the one or more stacks enabling linear undo operations within the region; and
recording the modification using at least one of the data structure and the one or more stacks provided for the region.

17. The method of claim 16, wherein the modification is an undo operation and the one or more stacks includes a redo stack.

18. The method of claim 16, wherein the modification is a redo operation and the one or more stacks includes an undo stack.

19. The method of claim 16, wherein the modification results in an addition of at least one line of content in the region.

20. The method of claim 16, wherein the modification results in a deletion of at least one line of content in the region.

* * * * *